US011981153B2

(12) United States Patent
Kawajiri

(10) Patent No.: US 11,981,153 B2
(45) Date of Patent: May 14, 2024

(54) PRINTING APPARATUS

(71) Applicant: SEIKO EPSON CORPORATION, Tokyo (JP)

(72) Inventor: Masahiro Kawajiri, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 17/804,641

(22) Filed: May 31, 2022

(65) Prior Publication Data

US 2022/0379629 A1 Dec. 1, 2022

(30) Foreign Application Priority Data

Jun. 1, 2021 (JP) ................................ 2021-092334

(51) Int. Cl.
*B41J 3/407* (2006.01)
*B41J 11/00* (2006.01)
*B41J 15/04* (2006.01)

(52) U.S. Cl.
CPC ......... *B41J 3/4075* (2013.01); *B41J 11/0095* (2013.01); *B41J 15/042* (2013.01)

(58) Field of Classification Search
CPC ..... B41J 3/4075; B41J 11/0095; B41J 15/042
See application file for complete search history.

(56) References Cited

U.S. PATENT DOCUMENTS

| | | | | |
|---|---|---|---|---|
| 2015/0328909 | A1* | 11/2015 | Takizawa | B65H 20/005 242/419 |
| 2016/0200122 | A1* | 7/2016 | Horaguchi | B41J 11/007 347/16 |
| 2017/0106682 | A1* | 4/2017 | Akahane | B65H 23/16 |

FOREIGN PATENT DOCUMENTS

| | | |
|---|---|---|
| JP | 2015-048169 A | 3/2015 |

* cited by examiner

*Primary Examiner* — Scott A Richmond
(74) *Attorney, Agent, or Firm* — WORKMAN NYDEGGER

(57) ABSTRACT

A label printer includes: a feed control lever configured to rotate following a change in length of a roll paper between a transport roller pair and a feed roller pair, a first detector configured to detect a rotational angle of the feed control lever, a second detector configured to detect the rotational angle of the feed control lever, and a printing control unit, wherein the transport roller pair has a first mode in which the roll paper is transported at a first transport speed, and a second mode in which the roll paper is transported at a second transport speed that is slower than the first transport speed, the printing control unit is configured to control the feed roller pair based on the first detector in the first mode, and is configured to control the feed roller pair based on the second detector in the second mode.

6 Claims, 11 Drawing Sheets

PRINTING APPARATUS

The present application is based on, and claims priority from JP Application Serial Number 2021-092334, filed Jun. 1, 2021, the disclosure of which is hereby incorporated by reference herein in its entirety.

BACKGROUND

1. Technical Field

The present disclosure relates to a printing apparatus.

2. Related Art

Conventionally, there has been known a printing apparatus that includes: a medium transport mechanism configured to transport a printing medium, and a medium supply mechanism configured to supply a printing medium toward the medium transport mechanism. For example, JP-A-2015-048169 discloses a printer that includes: a paper transport roller pair, and a feed roller configured to supply roll paper toward the paper transport roller pair.

In the printing apparatus disclosed in JP-A-2015-048169, when driving of the medium supply mechanism is controlled without taking into account a transport speed of the medium transport mechanism, there exists a possibility that an excessively large tension is applied to a printing medium between the medium transport mechanism and the medium supply mechanism, or excessively large slackening occurs in the printing medium between the medium transport mechanism and the medium supply mechanism.

SUMMARY

According to an aspect of the present disclosure, there is provided a printing apparatus including: a medium transport mechanism configured to transport a printing medium, a printing head configured to perform printing on the printing medium transported by the medium transport mechanism, a medium supply mechanism configured to supply the printing medium toward the medium transport mechanism, a movable member positioned between the medium transport mechanism and the medium supply mechanism on a transport path of the printing medium, the movable member being configured to move following a change in length of the printing medium between the medium transport mechanism and the medium support mechanism, a first detector configured to detect whether a moving amount of the movable member becomes equal to or more than a first threshold, a second detector configured to detect whether the moving amount of the movable member becomes equal to or more than a second threshold that is larger than the first threshold, and a control unit configured to control driving of the medium supply mechanism based on a detection result of the first detector and a detection result of the second detector, wherein the medium transport mechanism has, as a drive mode, a first mode in which the printing medium is transported at a first transport speed, and a second mode in which the printing medium is transported at a second transport speed that is slower than the first transport speed, the control unit is configured to control the driving of the medium supply mechanism based on the detection result of the first detector when the medium transport mechanism is driven in the first mode, and is configured to control the driving of the medium supply mechanism based on the detection result of the second detector when the medium transport mechanism is driven in the second mode.

According to another aspect of the present disclosure, there is provided a printing apparatus including: a medium transport mechanism configured to transport a printing medium, a printing head configured to perform printing on the printing medium transported by the medium transport mechanism, a medium supply mechanism configured to supply the printing medium toward the medium transport mechanism, a movable member positioned between the medium transport mechanism and the medium supply mechanism on a transport path of the printing medium, the movable member being configured to move following a change in length of the printing medium between the medium transport mechanism and the medium supply mechanism, a detection unit configured to detect a moving amount of the movable member, and a control unit configured to control driving of the medium supply mechanism based on a detection result of the detection unit, wherein the medium transport mechanism has, as a drive mode, a first mode in which the printing medium is transported at a first transport speed, and a second mode in which the printing medium is transported at a second transport speed that is slower than the first transport speed, and the control unit is configured to drive the medium supply mechanism when the moving amount of the movable member reaches a first moving amount or more in a case where the medium transport mechanism is driven in the first mode, and is configured to drive the medium supply mechanism when the moving amount of the movable member reaches a second moving amount or more that is larger than the first moving amount in a case where the medium transport mechanism is driven in the second mode.

According to still another aspect of the present disclosure, there is provided a printing apparatus including: a medium transport mechanism configured to transport a printing medium, a printing head configured to perform printing on the printing medium transported by the medium transport mechanism, a medium supply mechanism configured to supply the printing medium toward the medium transport mechanism, and a control unit configured to control driving of the medium supply mechanism, wherein the medium transport mechanism has, as a drive mode, a first mode in which the medium transport mechanism transports the printing medium at a first transport speed, and a second mode in which the medium transport mechanism transports the printing medium at a second transport speed that is slower than the first transport speed, and the control unit is configured to perform control to set a supply speed of the medium supply mechanism to a first supply speed when the medium transport mechanism is driven in the first mode, and is configured to perform control to set the supply speed of the medium supply mechanism to a second supply speed that is slower than the first supply speed when the medium transport mechanism is driven in the second mode.

DESCRIPTION OF EXEMPLARY EMBODIMENTS

Hereinafter, exemplary embodiments are described with reference to drawings.

In FIG. 1, FIG. 2, FIG. 3, FIG. 4, FIG. 9, FIG. 10, and FIG. 11, an X-axis, a Y-axis, and a Z-axis are illustrated. The X-axis, the Y-axis, and the Z-axis are orthogonal to each other. The Z-axis indicates a vertical direction. The X-axis and the Y-axis are parallel to a horizontal direction. The X-axis indicates a left-and-right direction. The Y-axis indicates a fore-and-aft direction. A positive direction of the X-axis indicates a rightward direction. A positive direction of the Y-axis indicates a frontward direction. A positive direction of the Z-axis indicates an upward direction.

First Embodiment

Figure 1:
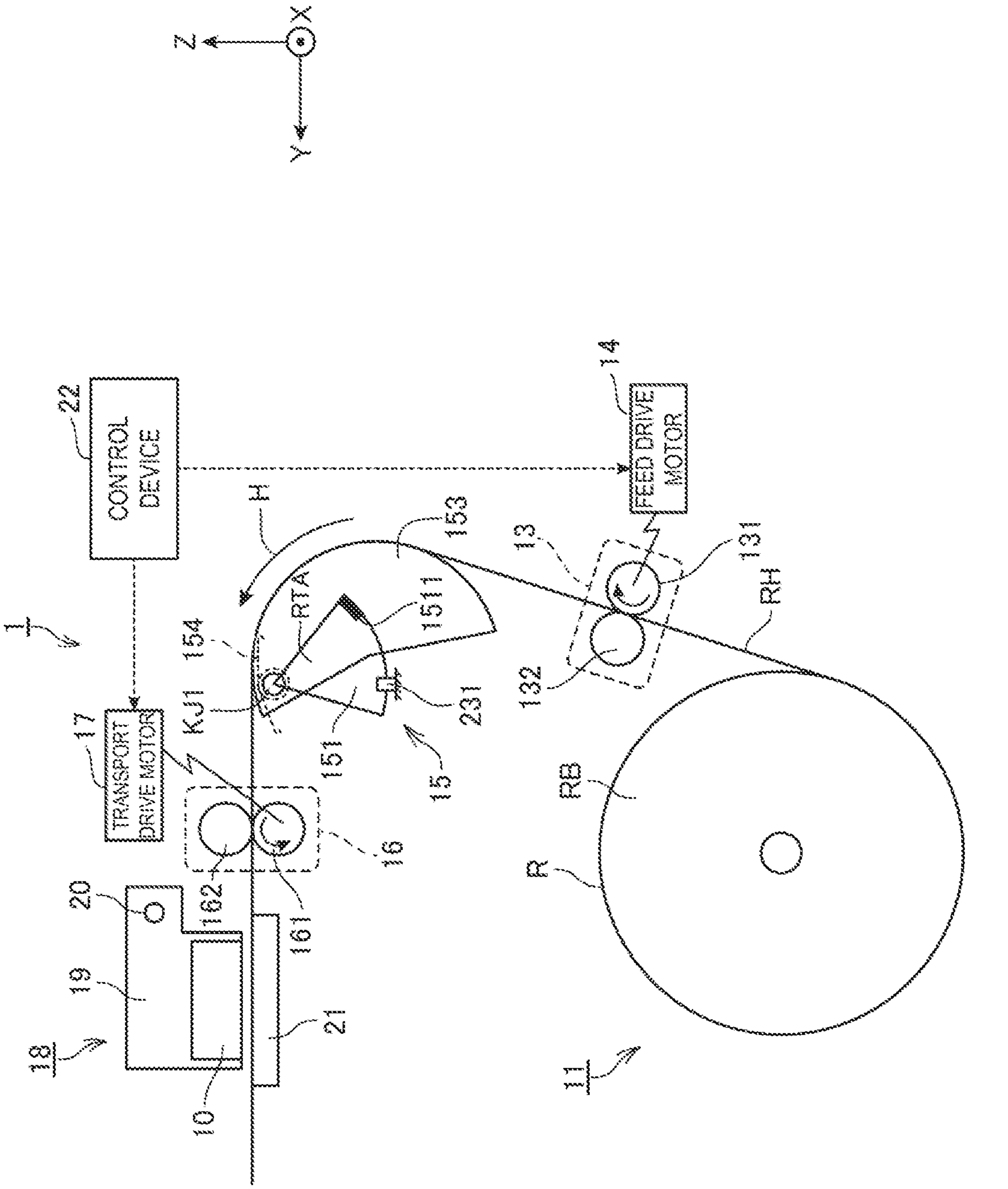
FIG. 1 is a view illustrating a configuration of a label printer.

FIG. 1 is a view illustrating a configuration of a label printer 1 according to a first embodiment.

The label printer 1 corresponds to an example of a printing apparatus.

The label printer 1 is a serial inkjet printer. The label printer 1 accommodates a roll paper R, transports the accommodated roll paper R in a transport direction H, and applies printing to the roll paper R by a printing head 10 that is a serial inkjet head.

The roll paper R corresponds to an example of a printing medium.

The roll paper R is a label paper in a roll shape in which labels are adhered to a mount at a predetermined interval. The label printer 1 applies printing to the labels of the roll paper R by the printing head 10.

The label printer 1 includes a roll paper accommodating unit 11 for accommodating the roll paper R. In the description made hereinafter, with respect to the roll paper R, a portion in a roll shape accommodated in a roll paper accommodating portion 11 is referred to as a "roll body", and symbol "RB" is affixed to the "roll body". Further, with respect to the roll paper R, a label paper fed and transported from the roll body RB is referred to as a "transport roll paper", and symbol "RH" is affixed to the "transport roll paper".

A transport path through which the transport roll paper RH is transported is formed in the label printer 1. The transport roll paper RH fed from the roll body RB is transported in the transport direction H along the transport path.

The label printer 1 includes a feed roller pair 13. The feed roller pair 13 is disposed downstream of the roll body RB in the transport direction H. The feed roller pair 13 includes a feed rotating roller 131 and a feed driven roller 132 that rotates following the rotation of the feed rotating roller 131. The feed driven roller 132 is disposed at a position on a side opposite to the feed rotating roller 131 on the transport path of the transport roll paper RH. The feed rotating roller 131 is coupled to a feed drive motor 14 by way of a power transmission mechanism not illustrated in the drawing, and rotates in response to the driving of the feed drive motor 14. The feed roller pair 13 sandwiches the transport roll paper RH by the feed rotating roller 131 and the feed driven roller 132, and feeds the transport roll paper RH from the roll body RB due to the rotation of the feed rotating roller 131. The feed roller pair 13 supplies the fed transport roll paper RH toward a transport roller pair 16.

The feed roller pair 13 corresponds to an example of a medium supply mechanism.

The label printer 1 includes a feed control lever 15. The feed control lever 15 is disposed downstream of the feed roller pair 13 in the transport direction H. The feed control lever 15 moves following a change in length of the transport roll paper RH between the feed roller pair 13 and the transport roller pair 16. More specifically, the feed control lever 15 rotates about a rotary shaft KJ1 that extends in the left-and-right direction, following the change in length of the transport roll paper RH.

In the description made hereinafter, a clockwise direction and a counterclockwise direction are rotational directions with reference to a case where the feed control lever 15 is viewed from a right side.

The feed control lever 15 corresponds to an example of a movable member.

In the description made hereinafter, the transport roll paper RH between the feed roller pair 13 and the transport roller pair 16 is referred to as an "inter-roller transport roll paper".

The label printer 1 includes the transport roller pair 16. The transport roller pair 16 is disposed downstream of the feed control lever 15 in the transport direction H. The transport roller pair 16 includes a transport rotating roller 161 and a transport driven roller 162 that rotates following the rotation of the transport rotating roller 161. The transport driven roller 162 is disposed at a position on a side opposite to the transport rotating roller 161 on the transport path of the transport roll paper RH. The transport rotating roller 161 is coupled to a transport drive motor 17 by way of the power transmission mechanism not illustrated in the drawing, and rotates in response to the driving of the transport drive motor 17. The transport roller pair 16 sandwiches the transport roll paper RH by the transport rotating roller 161 and the transport driven roller 162, and transports the transport roll paper RH supplied from the feed roller pair 13 in the transport direction H due to the rotation of the transport rotating roller 161.

The transport roller pair 16 corresponds to an example of a medium transport mechanism.

The label printer 1 includes a printing unit 18. The printing unit 18 is disposed downstream of the transport roller pair 16 in the transport direction H. The printing unit 18 includes a carriage 19, and a printing head 10 mounted on the carriage 19.

The carriage 19 is supported by a carriage shaft 20 extending in an orthogonal direction orthogonal to the transport direction H, and causes the printing head 10 to perform scanning in the orthogonal direction along the carriage shaft 20.

The printing head 10 includes nozzle rows respectively corresponding to four colors of cyan (C), yellow (Y), magenta (M), and black (K), for example. The printing head

10 receives the supply of inks from ink storage units not illustrated in the drawing such as an ink cartridges or ink tanks, and discharges the inks from the nozzles provided to the respective nozzle rows thus forming dots on the transport roll paper RH. Here, the printing head 10 is not limited to a head capable of performing color printing using ink of four colors (CMYK). For example, the printing head 10 may be a head capable of performing full-color printing using inks of multiple colors where special color inks are added to the inks of four colors (CMYK), or may be a head capable of performing monochrome printing or two-color printing.

On the transport path of the transport roll paper RH, a platen 21 is disposed at a position on a side opposite to the printing head 10. The platen 21 extends over a range where dots can be formed by the printing head 10, and supports the transport roll paper RH in a flattened state such that a surface of the transport roll paper RH located at the platen 21 is perpendicular to an ejection direction of the ink ejected from the printing head 10. Here, the platen 21 may be a so-called suction platen that is a platen where the transport roll paper RH is sucked by applying a suction force to the transport roll paper RH.

The label printer 1 includes a control device 22 that controls respective units of the label printer 1.

The feed control lever 15 is described in detail.

Figure 2:
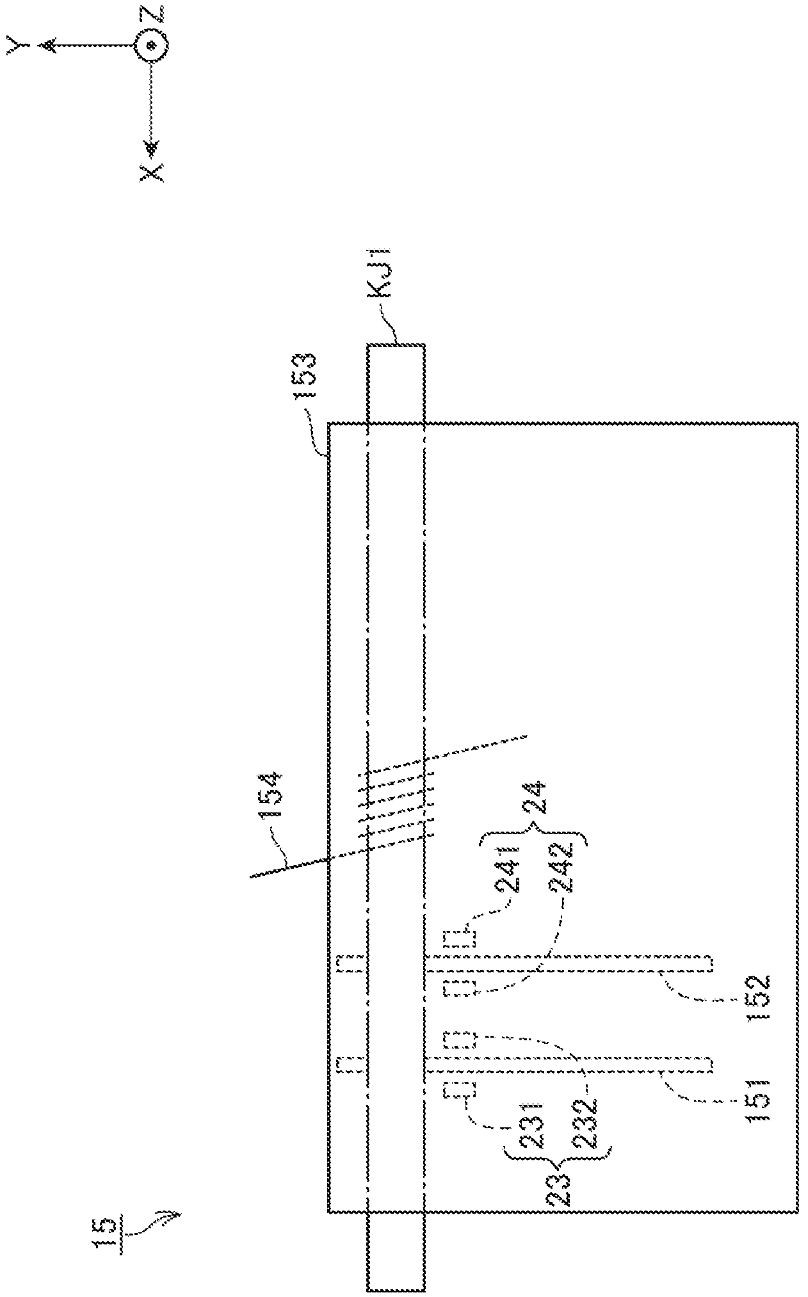
FIG. 2 is a view of a feed control lever as viewed from above.

FIG. 2 is a view of the feed control lever 15 as viewed from above.

The feed control lever 15 includes a first feed control plate 151, a second feed control plate 152, and a tension member 153.

The first feed control plate 151 corresponds to an example of a first movable member. The second feed control plate 152 corresponds to an example of a second movable member.

The tension member 153 rotates about the rotary shaft KJ1 following a change in length of the inter-roller transport roll paper. The tension member 153 is biased by a biasing member 154 such as a spring, and applies a predetermined tension to the inter-roller transport roll paper. The transport roll paper RH is fed upward from the roll body RB on the transport path of the transport roll paper RH and, thereafter, the transport roll paper RH extends over the tension member 153, and is bent frontward.

Figure 3:
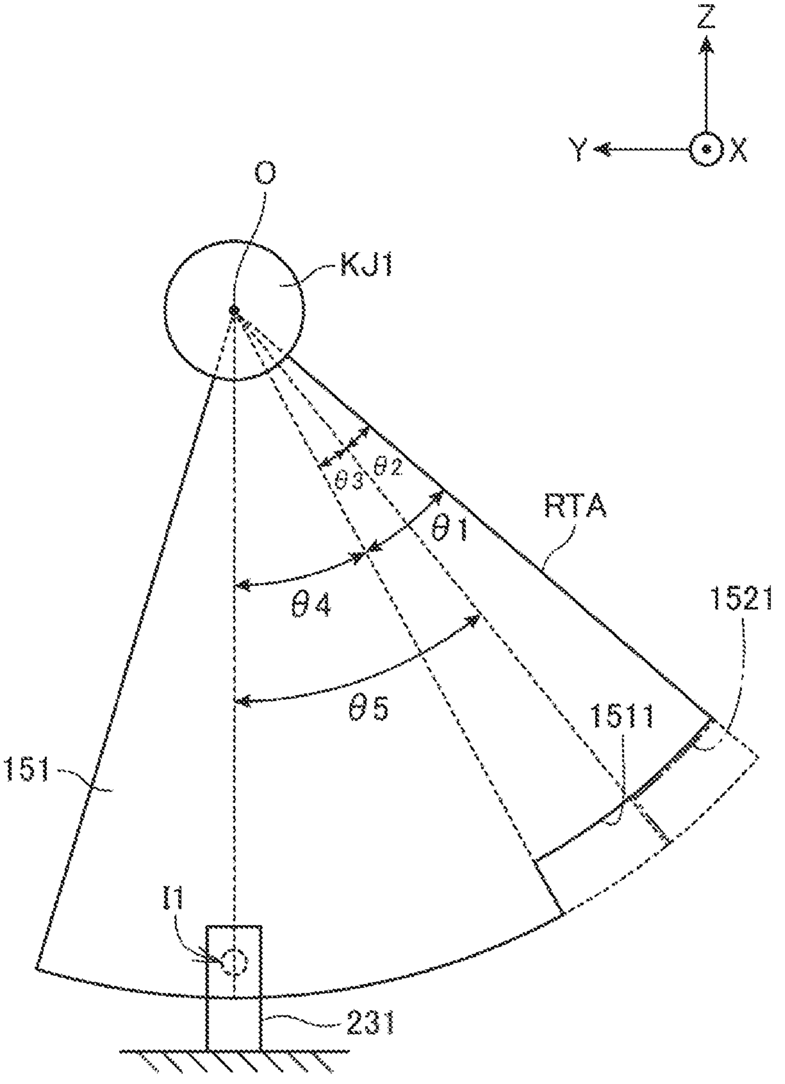
FIG. 3 is a view of a first feed control plate as viewed from a right side.
Figure 4:
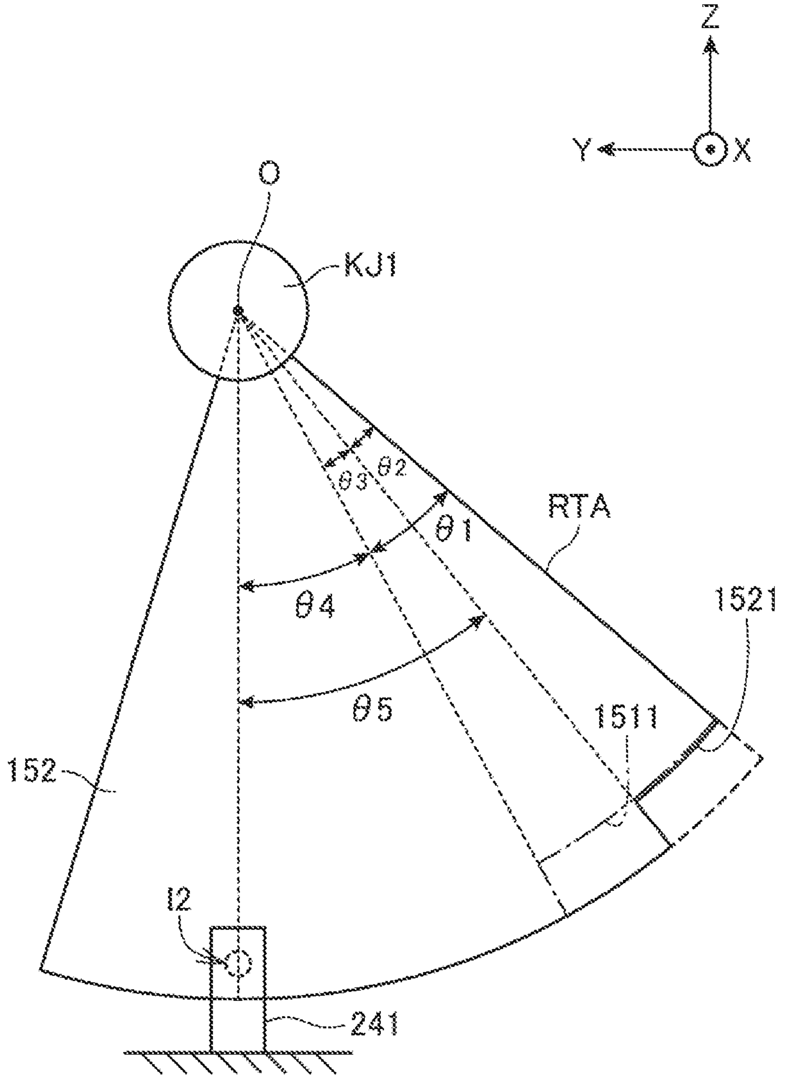
FIG. 4 is a view of a second feed control plate as viewed from a right side.

FIG. 3 is a view of the first feed control plate 151 as viewed from a right side. FIG. 4 is a view of the second feed control plate 152 as viewed from a right side. In FIG. 3, for the comparison between a length of a first cutout 1511 and a length of a second cutout 1521, the second cutout 1521 is indicated by a dotted chain line for the sake of convenience. In FIG. 4, for the comparison between the length of the first cutout 1511 and the length of the second cutout 1521, the first cutout 1511 is indicated by a dotted chain line for the sake of convenience.

The first feed control plate 151 is a member having a fan shape. The first feed control plate 151 of the present embodiment is made of a material having a light shielding property. In the first feed control plate 151, the first cutout 1511 is formed at an outer peripheral edge portion. The first cutout 1511 is formed extending in a circumferential direction from a rear end edge RTA that corresponds to a radius of the fan shape. A length of the first cutout 1511 in the circumferential direction is a length corresponding to an angle θ1. The angle θ1 is an angle from the rear end edge RTA with the center of rotation O of a rotary shaft KJ as an apex.

The first cutout 1511 corresponds to an example of a first light transmitting portion.

The second feed control plate 152 is a member having a fan shape. The second feed control plate 152 is the same as the first feed control plate 151 with respect to a radius of the fan shape and a length of an arc of the fan shape. The second feed control plate 152 of the present embodiment is made of a material having a light shielding property. In the second feed control plate 152, the second cutout 1521 is formed at an outer peripheral edge portion. The second cutout 1521 is formed extending in a circumferential direction from the rear end edge RTA that corresponds to the radius of the fan shape. A length of the second cutout 1521 in the circumferential direction is a length corresponding to an angle θ2. The angle θ2 is an angle from the rear end edge RTA with the center of rotation O of the rotary shaft KJ as an apex. The angle θ2 is smaller than the angle θ1 by an amount of angle θ3. Accordingly, the length of the second cutout 1521 in the circumferential direction is formed shorter than the length of the first cutout 1511 in the circumferential direction.

The second cutout 1521 corresponds to an example of a second light transmitting portion.

The first feed control plate 151 and the second feed control plate 152 are arranged in parallel in the left-and-right direction, and are provided such that the centers of the fan shapes agree with the center of rotation O of the rotary shaft KJ1 in the vertical direction. Further, the first feed control plate 151 and the second feed control plate 152 are provided such that the angles of the rear end edges RTA with respect to the vertical direction become equal. The first feed control plate 151 and the second feed control plate 152 rotate with the same rotational angle about the rotary shaft KJ1 in synchronization with the rotation of the tension member 153.

The label printer 1 includes a first detector 23. The first detector 23 is an optical sensor, and includes a first-emission unit 231 configured to emit light and a first light-receiving unit 232 configured to receive light. The first light emission unit 231 is formed of a light emitting diode (LED), a laser light emitting element or the like, for example. The first light-receiving unit 232 is formed of a photo-transistor, a photo IC or the like. The first feed control plate 151 is disposed between the first emission unit 231 and the first light-receiving unit 232 in the left-and-right direction. The first emission unit 231 emits light toward the first feed control plate 151. The first emission unit 231 of the present embodiment emits light in the leftward direction. The leftward direction corresponds to an example of a light advancing direction. The first light-receiving unit 232 is disposed at a position on a side opposite to the first emission unit 231 in a state where a light-receiving surface of the first light-receiving unit 232 faces the first feed control plate 151.

When a portion to which light is emitted by the first emission unit 231 is a portion other than the first cutout 1511, the light emitted from the first emission unit 231 is blocked by the first feed control plate 151. In this case, the first light-receiving unit 232 does not receive the light emitted from the first emission unit 231, and the first detector 23 outputs a low-level detection value.

On the other hand, when a portion to which light is emitted by the first emission unit 231 is the first cutout 1511, the first cutout 1511 causes the light emitted from the first emission unit 231 to pass therethrough. Accordingly, the first light-receiving unit 232 receives the light emitted from the first emission unit 231, and the first detector 23 outputs a High-level detection value.

When the feed control lever 15 is located at a fixed position, the first emission unit 231 emits light to a first position I1. The fixed position of the feed control lever 15 is a position of the feed control lever 15 when the feed control lever 15 is rotated most in the counterclockwise direction within a range where the feed control lever 15 is rotatable, and the fixed position is defined by a biasing force of the biasing member 154. The feed control lever 15 is not rotated in the counterclockwise direction from the fixed position. When the feed control lever 15 rotates by an angle θ4 or more in the clockwise direction from the fixed position, the first emission unit 231 emits light to the first cutout 1511.

The angle θ4 corresponds to an example of a first threshold.

The label printer 1 includes a second detector 24. The second detector 24 is an optical sensor, and includes a second emission unit 241 configured to emit light, and a second light-receiving unit 242 configured to receive the light. The second emission unit 241 is formed of an LED, a laser light emitting element or the like, for example. The second light-receiving unit 242 is formed of a photo-transistor, a photo IC or the like. The second feed control plate 152 is disposed between the second emission unit 241 and the second light-receiving unit 242 in the left-and-right direction. The second emission unit 241 emits light toward the second feed control plate 152. The second emission unit 241 of the present embodiment emits light in the leftward direction. The second light-receiving unit 242 is disposed at a position on a side opposite to the second emission unit 241 in a state where a light-receiving surface of the second light-receiving unit 242 faces the second feed control plate 152.

When a portion to which light is emitted by the second emission unit 241 is a portion other than the first cutout 1521 of the second feed control plate 152, the light emitted from the second emission unit 241 is blocked by the second feed control plate 152. In this case, the second light-receiving unit 242 does not receive the light emitted from the second emission unit 241, and the second detector 24 outputs a low-level detection value.

On the other hand, when a portion to which light is emitted by the second emission unit 241 is the second cutout 1521 of the second feed control plate 152, the second cutout 1521 causes the light emitted from the second emission unit 241 to pass therethrough. In this case, the second light-receiving unit 242 receives the light emitted from the second emission unit 241, and the second detector 24 outputs a high-level detection value.

When the feed control lever 15 is located at the fixed position, the second emission unit 241 emits light to a second position 12. When the feed control lever 15 rotates by an angle θ5 or more in the clockwise direction from the fixed position, the second emission unit 241 emits light to the second cutout 1521.

The angle θ5 is larger than the angle θ4 by an amount of the angle θ3. The angle θ5 corresponds to an example of a second threshold.

Figure 5:
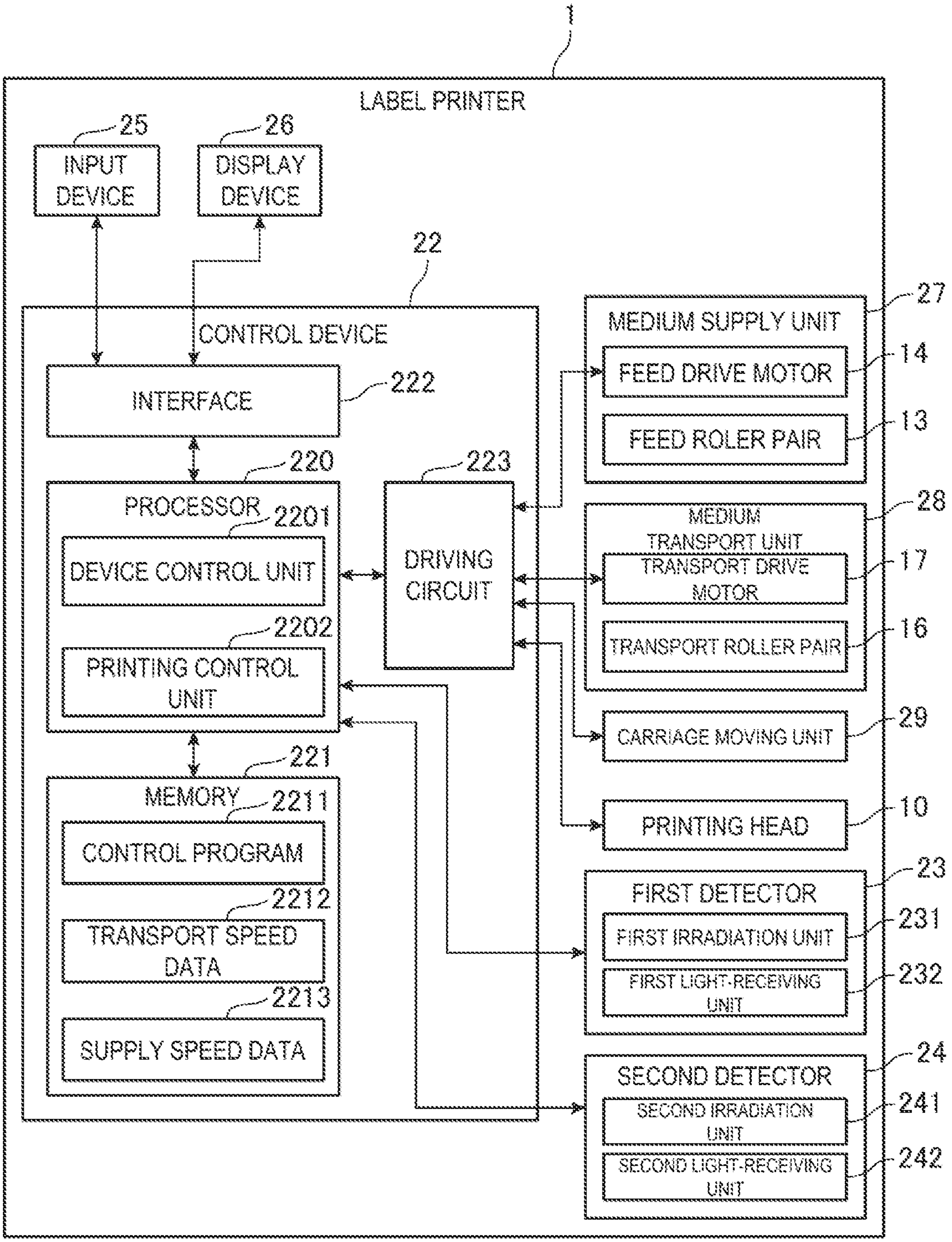
FIG. 5 is a block diagram illustrating a configuration of a control system of the label printer.

FIG. 5 is a block diagram illustrating a configuration of a control system of the label printer 1.

The label printer 1 includes an input device 25 and a display device 26. The input device 25 and the display device 26 are coupled to the control device 22. The input device 25 is a device that allows an operator who operates the label printer 1 to input printing conditions and the like, and is an input device such as a keyboard or a mouse, for example. The input device 25 may also be a desktop-type or a laptop-type personal computer, a tablet-type terminal, a portable-type terminal or the like, and the input device 25 may be provided as a separate body from the label printer 1. The input device 25 outputs information inputted by an operator to the control device 22. The display device 26 includes a display screen such as a liquid crystal display panel, and displays various information in accordance with a control performed by the control device 22.

The control device 22 includes a processor 220 such as a Central Processing Unit (CPU) or a Micro-processing unit (MPU), a memory 221, an interface 222, and a driving circuit 223.

The processor 220 controls respective units of the control device 22 by reading and executing a control program 2211 that the memory 221 stores. The processor 220 functions as a device control unit 2201 and a printing control unit 2202 by executing the control program 2211 stored in the memory 221.

The printing control unit 2202 corresponds to an example of a control unit.

The memory 221 stores the control program 2211 that the processor 220 executes, setting data relating to setting of the label printer 1, transport speed data 2212, supply speed data 2213, and other various kinds of data. The memory 221 has a non-volatile storage region. Further, the memory 221 may include a volatile storage region, and may constitute a work area of the processor 220. The transport speed data 2212 is data indicating a transport speed of the transport roller pair 16. In the present embodiment, the transport speed indicated by the transport speed data 2212 is either one of a first transport speed V1 or a second transport speed V2 that is slower than the first transport speed V1. The transport speed indicated by the transport speed data 2212 is changed based on an instruction by an operator. The supply speed data 2213 indicates a supply speed of the transport roll paper RH by the feed roller pair 13. In the present embodiment, the supply speed indicated by the supply speed data 2213 is only king of speed VK.

The interface 222 includes communication hardware such as conductive connectors, an interface circuit and the like. The interface 222 is coupled to the input device 25 and the display device 26, and performs data communication with these devices.

The label printer 1 includes a medium supply unit 27, a medium transport unit 28, a carriage moving unit 29, and the printing head 10. The driving circuit 223 is coupled to the medium supply unit 27, the medium transport unit 28, the carriage moving unit 29, and the printing head 10.

The control device 22 controls the driving circuit 223 to cause the driving circuit 223 to output a control signal thus driving the medium supply unit 27, the medium transport unit 28, the carriage moving unit 29, and the printing head 10.

The medium supply unit 27 includes the feed drive motor 14 and the feed roller pair 13.

The control device 22 drives the feed drive motor 14 so that the feed drive motor 14 rotates the feed rotating roller 131. The control device 22 causes the driving circuit 223 to output a feed control signal to the feed drive motor 14 based on the supply speed data 2213 so that a supply speed of the transport roll paper RH is set to the speed VK.

The medium transport unit 28 includes the transport drive motor 17 and the transport roller pair 16.

The control device 22 drives the transport drive motor 17 to rotate the transport rotating roller 161 thus causing the transport roller pair 16 to transport the transport roll paper RH. The control device 22 sets the drive mode of the transport roller pair 16 to a first mode or a second mode, and causes the transport roller pair 16 to transport the transport roll paper RH in either drive mode. The first mode is a drive mode of the transport roller pair 16 when the transport roller pair 16 transports the transport roll paper RH at the first transport speed V1. The second mode is a drive mode of the transport roller pair 16 when the transport roller pair 16 transports the transport roll paper RH at the second transport speed V2.

When the transport speed data 2212 indicates the first transport speed V1, the control device 22 drives the transport roller pair 16 in the first mode. In the first mode, the control device 22 causes the driving circuit 223 to output a first transport control signal to the transport drive motor 17 so that the transport speed of the transport roll paper RH is set to the first transport speed V1. In the first mode, the control device 22 performs first acceleration and deceleration processing at a predetermined cycle. The first acceleration and deceleration processing is processing in which the transport speed of the transport rotating roller 161 is accelerated from zero to the first transport speed V1, and after the elapse of a predetermined time, the transport speed is decelerated from the first transport speed V1 to zero.

Further, when the transport speed data 2212 indicates the second transport speed V2, the control device 22 drives the transport roller pair 16 in the second mode. In the second mode, the control device 22 causes the driving circuit 223 to output a second transport control signal to the transport drive motor 17 so that the transport speed of the transport roll paper RH is set to the second transport speed V2. In the second mode, the control device 22 performs second acceleration and deceleration processing at a predetermined cycle. The second acceleration and deceleration processing is processing in which the transport speed of the transport rotating roller 161 is accelerated from zero to the second transport speed V2, and after the elapse of a predetermined time, the transport speed is decelerated from the second transport speed V2 to zero.

The carriage moving unit 29 has constitutional elements such as the carriage 19, a motor that causes the carriage 19 to perform scanning, a power transmission mechanism that transmits power of the motor to the carriage 19 and the like. The control device 22 drives the motor that the carriage moving unit 29 includes to move the carriage 19 in the left-and-right direction.

The control device 22 drives the printing head 10 to cause the printing head 10 to eject inks toward the transport roll paper RH. The control device 22 controls the carriage moving unit 29 and the printing head 10 to move the carriage 19 while causing the printing head 10 to eject inks, and transports the transport roll paper RH in the transport direction H.

The first detector 23 and the second detector 24 are coupled to the control device 22. The control device 22 acquires detection values of the first detector 23 and the second detector 24 and reflects the detection values in the driving control of the feed roller pair 13.

As described above, the processor 220 functions as the device control unit 2201 and the printing control unit 2202.

The device control unit 2201 receives an operation by the operator via the input device 25, and causes the display device 26 to display various kinds of information.

The printing control unit 2202 controls the medium supply unit 27, the medium transport unit 28, the carriage moving unit 29, and the printing head 10 to perform printing on the transport roll paper RH. The printing control unit 2202 controls driving of the feed roller pair 13 based on the detection values of the first detector 23 and the second detector 24. When the first detector 23 and the second detector 24 output low level detection values, the printing control unit 2202 stops the driving of the feed drive motor 14 to stop the driving of the feed roller pair 13. When the first detector 23 and the second detector 24 output high-level detection values, the printing control unit 2202 drives the feed drive motor 14 to drive the feed roller pair 13.

Next, the manner of operation of the label printer 1 is described.

Figure 6:
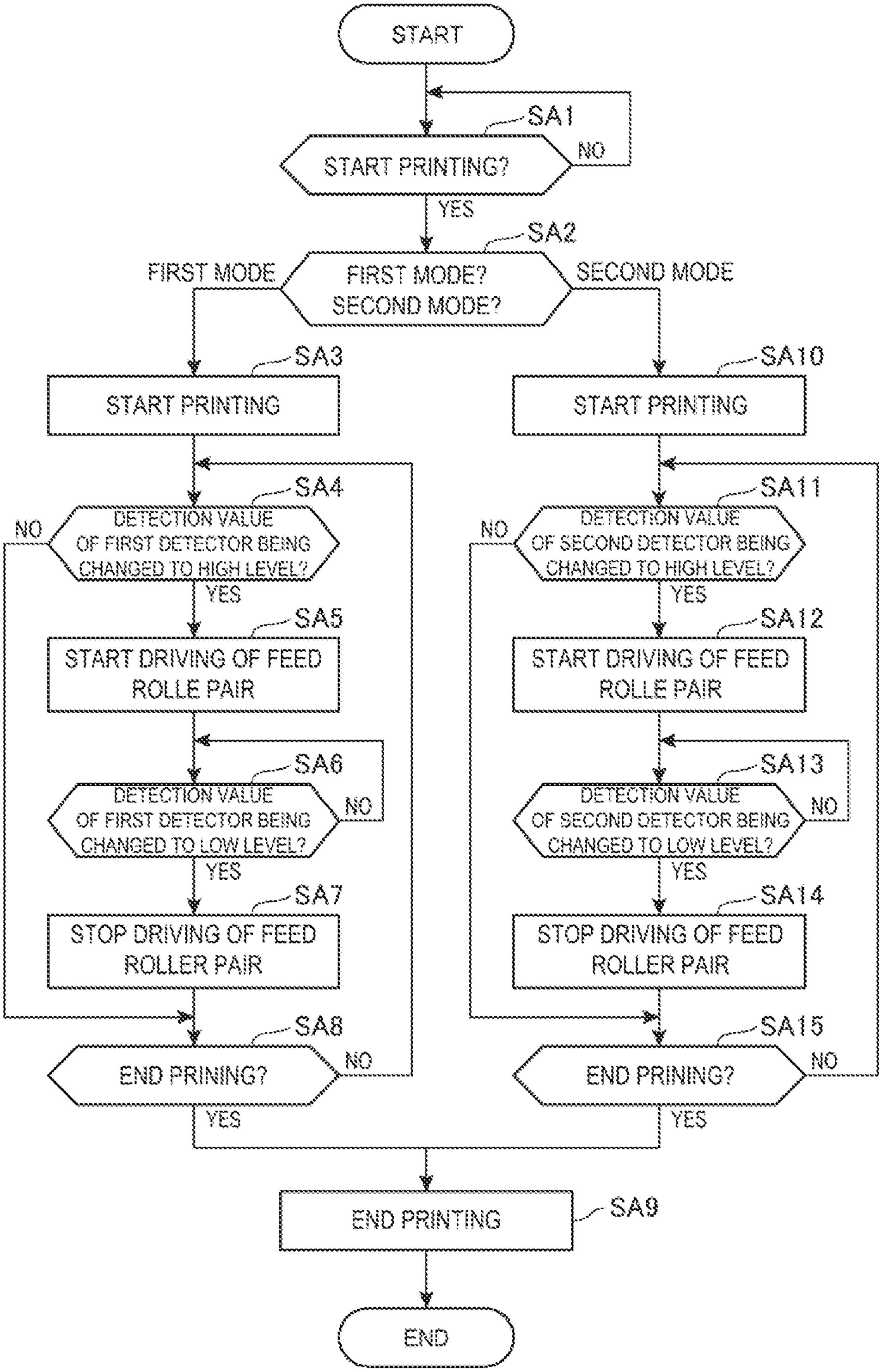
FIG. 6 is a flowchart illustrating the manner of operation of the label printer.

FIG. 6 is a flowchart illustrating the manner of operation of the label printer 1.

The printing control unit 2202 of the label printer 1 determines whether printing is to be started (step SA1).

For example, in step SA1, the printing control unit 2202 determines that printing is to be started when the printing control unit 2202 receives printing data from an external device. Further, for example, when the device control unit 2201 receives a printing start operation from the operator via the input device 25, the printing control unit 2202 determines that printing is to be started in step SA1.

When the printing control unit 2202 determines that the printing is not to be started (step SA1: NO), the printing control unit 2202 performs the determination in step SA1 again.

On the other hand, when the printing control unit 2202 determines that printing is to be started (step SA1: YES) the printing control unit 2202 determines whether the transport roller pair 16 is to be driven in the first mode or in accordance with the second mode (step SA2).

In step SA2, when the transport speed data 2212 stored in the memory 221 indicates the first transport speed V1, the printing control unit 2202 determines that the transport roller pair 16 is to be driven in the first mode. Further, in step SA2, when the transport speed data 2212 stored in the memory 221 indicates the second transport speed V2, the printing control unit 2202 determines that the transport roller pair 16 is to be driven in the second mode.

When the printing control unit 2202 determines that the transport roller pair 16 is to be driven in the first mode (step SA2: first mode), the printing control unit 2202 starts printing by the transport in accordance with the first mode (step SA3).

Next, the printing control unit 2202 determines whether the detection value of the first detector 23 is changed to the High level (step SA4). That is, the printing control unit 2202 determines whether the rotational angle of the feed control lever 15 from the fixed position is equal to or more than the angle θ4. The rotational angle of the feed control lever 15 corresponds to an example of a moving amount of the feed control lever 15.

When the printing control unit 2202 determines that the detection value of the first detector 23 is not changed to the High level (step SA4: NO), the printing control unit 2202 performs processing in step SA8.

On the other hand, when the printing control unit 2202 determines that the detection value of the first detector 23 is changed to the High level (step SA4: YES), the printing control unit 2202 starts driving of the feed roller pair 13 (step SA5).

Next, the printing control unit 2202 determines whether the detection value of the first detector 23 is changed to the Low level (step SA6). That is, the printing control unit 2202 determines whether the rotational angle of the feed control lever 15 from the fixed position becomes lower than the angle θ4.

When the printing control unit 2202 determines that the detection value of the first detector 23 is not changed to the Low level (step SA6: NO), the printing control unit 2202 performs the determination in step SA6 again.

On the other hand, when the printing control unit 2202 determines that the detection value of the first detector 23 is changed to the Low level (step SA6: YES), the printing control unit 2202 stops driving of the feed roller pair 13 (step SA7).

Next, the printing control unit 2202 determines whether the printing is to be finished (step SA8).

For example, when unprocessed data exists in the data included in the printing data, the printing control unit 2202 performs the negative determination in step SA8.

When the printing control unit 2202 determines that the printing is not to be finished (step SA8: NO), the printing control unit 2202 performs the processing in step SA4 and succeeding steps following step SA4 again.

On the other hand, when the printing control unit 2202 determines that the printing is to be finished (step SA8: YES), the printing control unit 2202 finishes the printing (step SA9).

Figure 7:
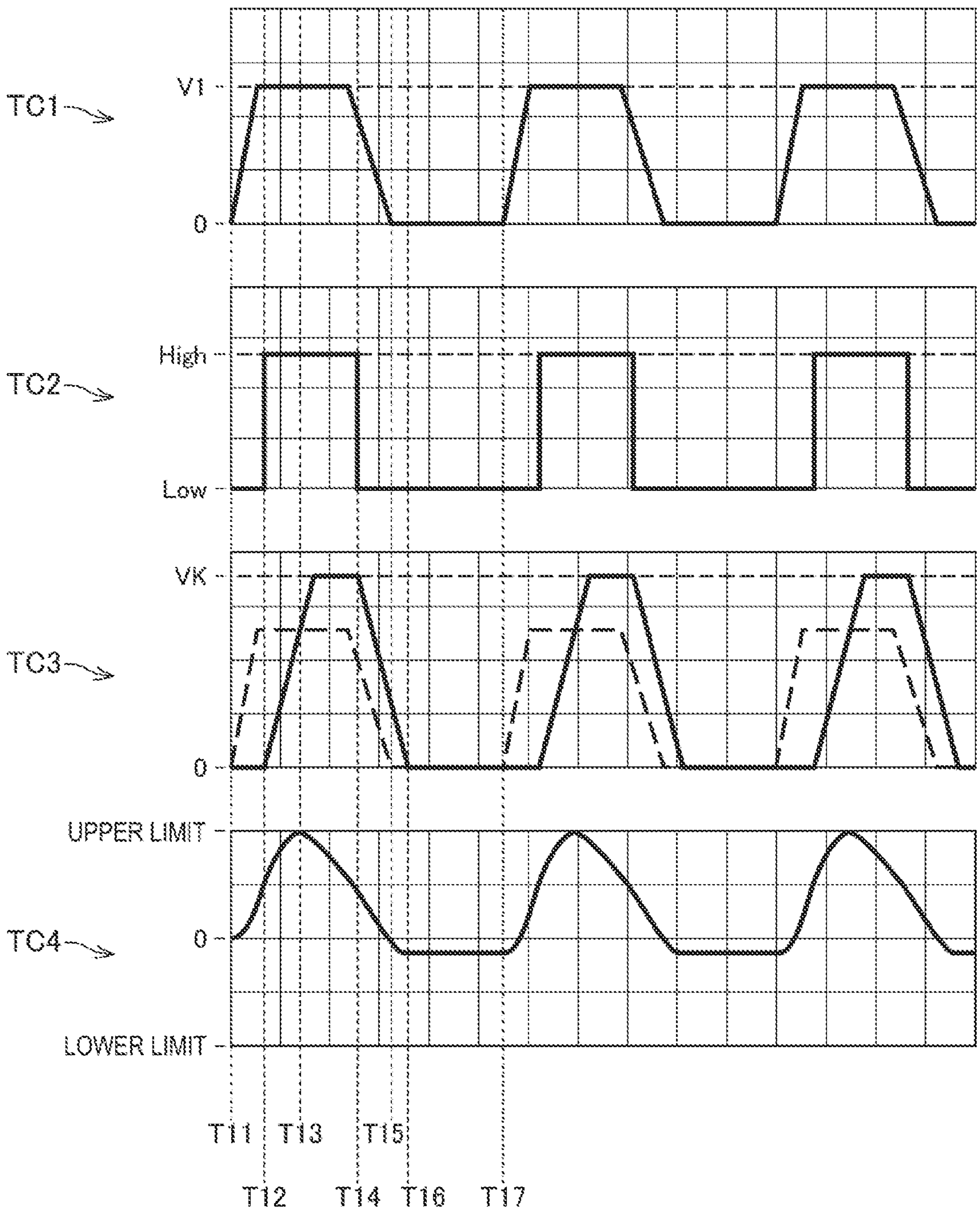
FIG. 7 is a timing chart when a pair of transport rollers is in a first mode.

FIG. 7 is a timing chart when the drive mode of the transport roller pair 16 is the first mode.

In FIG. 7, a timing chart TC1 indicates a state of the transport speed of the transport roller pair 16. In the timing chart TC1, a speed is taken on an axis of ordinates, and a time is taken on an axis of abscissas.

In FIG. 7, a timing chart TC2 indicates a state of the detection value of the first detector 23. In the timing chart TC2, the level of a detection value of the first detector 23 is taken on an axis of ordinates, and a time is taken on an axis of abscissas.

In FIG. 7, a timing chart TC3 indicates a state of the supply speed of the feed roller pair 13. In the timing chart TC3, a speed is taken on an axis of ordinates, and a time is taken on an abscissas. In the timing chart TC3, a state of the transport speed of the transport roller pair 16 in the first mode is indicated by a dotted line.

In FIG. 7, a timing chart TC4 indicates a state of the difference in feed amount. The difference in feed amount indicates the difference between a transport amount by the transport roller pair 16 per unit time and a supply amount by the feed roller pair 13 per unit time. With respect to the difference in feed amount, a length of the inter-roller transport roll paper when the feed control lever 15 is located at the fixed position, and a supply amount by the feed roller pair 13 and a transport amount by the transport roller pair 16 are equal to each other is set to zero. It is indicated that, when a value of the difference in feed amount is positive, the transport amount by the transport roller pair 16 is larger than the supply amount by the feed roller pair 13. Further, when a value of the difference in feed amount is negative, it is indicated that a transport amount by the transport roller pair 16 is smaller than a supply amount by the feed roller pair 13.

When the label printer 1 starts printing at a timing T11, the transport speed of the transport roller pair 16 increases from zero toward the first transport speed V1. When the transport speed of the transport roller pair 16 reaches the first transport speed V1, the transport roller pair 16 transports the transporting roll paper RH at the first transport speed V1. During a period between the timing T11 and a timing T12, driving of the feed roller pair 13 is stopped.

Accordingly, a length of the inter-roller transport roll paper is shortened during the period between the timing T11 and the timing T12 and hence, the feed control lever 15 rotates in the clockwise direction after the timing T11.

At the timing T12, when the rotational angle of the feed control lever 15 from the fixed position is equal to or more than the angle θ4, the detection value of the first detector 23 changes from the Low level to the High level. Along with such a change, after the timing T12, the supply speed of the feed roller pair 13 is accelerated from zero toward the speed VK. During a period between the timing T12 and a timing T13, the supply speed of the feed roller pair 13 is smaller than the transport speed of the transport roller pair 16. Accordingly, the length of the inter-roller transport roll paper is further shortened during the period between the timing T12 and the timing T13 and hence, the feed control lever 15 further rotates in the clockwise direction during the period between the timing T12 and the timing T13.

At the timing T13, the supply speed of the feed roller pair 13 becomes equal to the first transport speed V1, and after the timing T13, the supply speed of the feed roller pair 13 becomes larger than the first transport speed V1. Along with such a change, the inter-roller transport roll paper is increased after the timing T13 and hence, the feed control lever 15 switches the rotational direction thereof in the counterclockwise direction after the timing T13 and rotates in the counterclockwise direction by a biasing force of the biasing member 154.

When the rotational angle of the feed control lever 15 from the fixed position becomes lower than the angle θ4 at a timing T14, the detection value of the first detector 23 is changed from the High level to the Low level. Along with such a change, after the timing T14, the supply speed of the feed roller pair 13 is lowered from the speed VK toward zero.

At a timing T15, the transport speed of the transport roller pair 16 becomes zero. However, at the timing T15, the feed roller pair 13 is under deceleration. Accordingly, the feed roller pair 13 feeds the transport roll paper RH until a timing T16 at which the supply speed of the transport roll paper RH becomes zero.

At the timing T16, the supply speed of the feed roller pair 13 becomes zero. Accordingly, after the timing T16, slackening of the inter-roller transport roll paper is not increased until a timing T17 at which the transport roller pair 16 is driven again.

As illustrated in FIG. 7, in the printing by the transport in accordance with the first mode, the difference in feed amount is changed between an upper limit and a lower limit. The upper limit of the difference in feed amount is defined by the maximum rotational angle of the feed control lever 15 that is rotatable in the clockwise direction from the fixed position. When the difference in feed amount exceeds the upper limit, the increase of tension applied to the inter-roller transport roll paper is not alleviated by the rotation of the feed control lever 15 and hence, an excessively large tension is applied to the inter-roller transport roll paper. The lower limit of the difference in feed amount is defined by an amount of slackening of the transport roll paper RH that is allowable in the label printer 1. When the difference in feed amount becomes lower than the lower limit, in the label printer 1, excessively large slackening that may cause the paper jamming occurs on the inter-roller transport roll paper.

As illustrated in FIG. 7, in the printing by the transport in accordance with the first mode, the difference in feed amount is changed between the upper limit and the lower limit. Accordingly, in the printing by the transport in accordance with the first mode, the label printer 1 can suppress the occurrence of a phenomenon that an excessively large tension is applied to the inter-roller transport roll paper, and can suppress the occurrence of a phenomenon that the inter-roller transport roll paper is excessively largely slackened. Accordingly, the label printer 1 can appropriately control the driving of the feed roller pair 13 in the printing by the transport in accordance with the first mode.

Returning to the description of the processing in step SA2 in the flowchart illustrated in FIG. 6, when the printing control unit 2202 determines that the transport roller pair 16 is to be driven in the second mode (step SA2: second mode), the printing control unit 2202 starts printing by the transport in accordance with the second mode (step SA10).

Next, the printing control unit 2202 determines whether the detection value of the second detector 24 is changed to the High level (step SA11). That is, the printing control unit 2202 determines whether the rotational angle of the feed control lever 15 from the fixed position is equal to or more than the angle θ5.

When the printing control unit 2202 determines that the detection value of the second detector 24 is not changed to the High level (step SA11: NO), the printing control unit 2202 performs processing in step SA15.

On the other hand, when the printing control unit 2202 determines that the detection value of the second detector 24 is changed to the High level (step SA11: YES), the printing control unit 2202 starts driving of the feed roller pair 13 (step SA12).

Next, the printing control unit 2202 determines whether the detection value of the second detector 24 is changed to the Low level (step SA13). That is, the printing control unit 2202 determines whether the rotational angle of the feed control lever 15 from the fixed position becomes lower than the angle θ5.

When the printing control unit 2202 determines that the detection value of the second detector 24 is not changed to the Low level (step SA13: NO), the printing control unit 2202 performs the determination in step SA13 again.

On the other hand, when the printing control unit 2202 determines that the detection value of the second detector 24 is changed to the Low level (step SA13: YES), the printing control unit 2202 stops driving of the feed roller pair 13 (step SA14).

Next, the printing control unit 2202 determines whether the printing is to be finished (step SA15).

When the printing control unit 2202 determines that the printing is not to be finished (step SA15: NO), the printing control unit 2202 performs the processing in step SA11 and the subsequent processing again.

On the other hand, when the printing control unit 2202 determines that the printing is to be finished (step SA15: YES), the printing control unit 2202 finishes the printing (step SA10).

Figure 8:
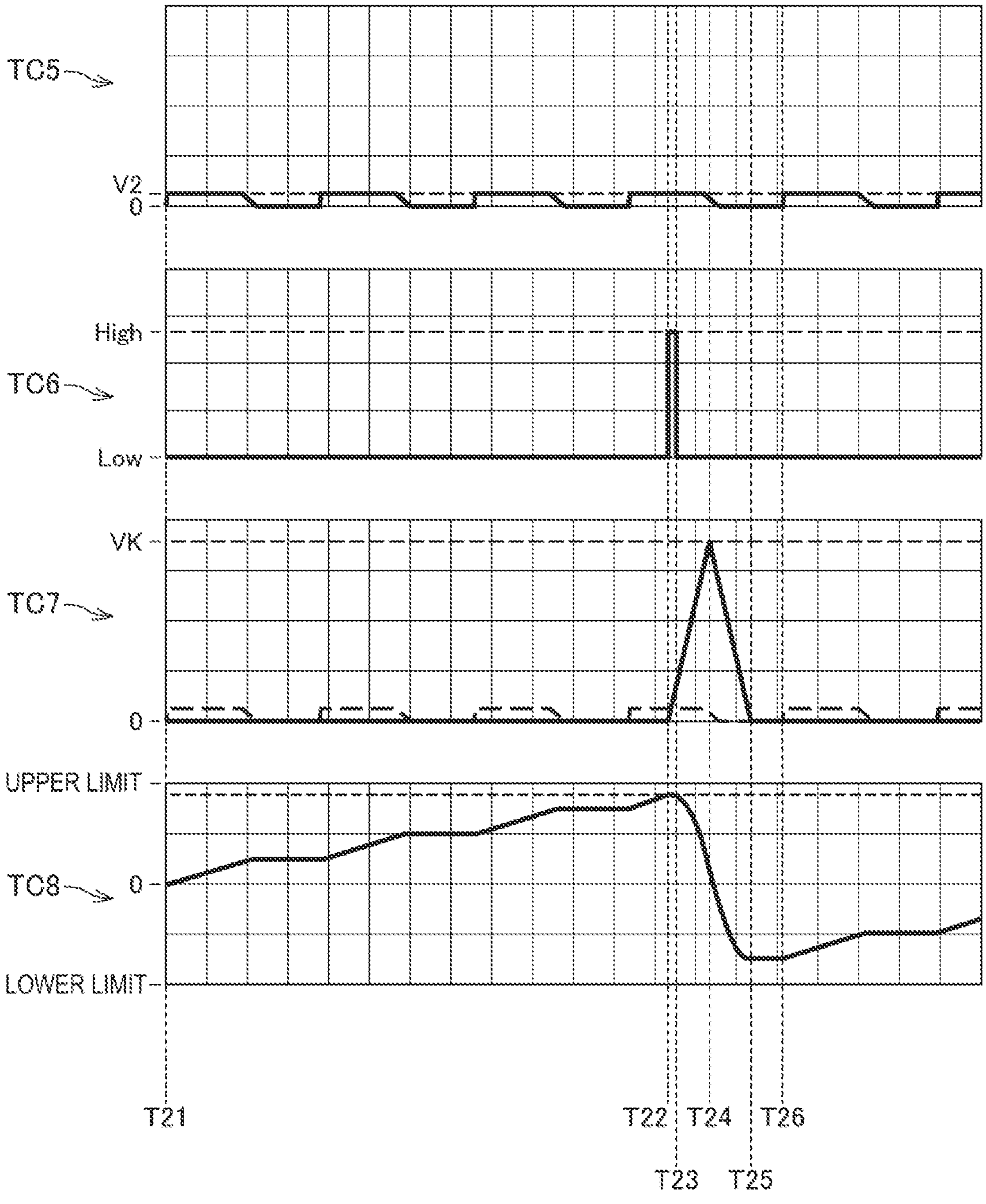
FIG. 8 is a timing chart when the pair of transport rollers is in a second mode.

FIG. 8 is a timing chart when the drive mode of the transport roller pair 16 is the second mode.

In FIG. 8, a timing chart TC5 indicates a state of the transport speed of the transport roller pair 16. In the timing chart TC5, the speed is taken on an axis of ordinates, and the time is taken on an abscissas. A scale width of an axis of ordinates in the timing chart TC5 is the same as the scale width of the axis of ordinates in the timing chart TC1.

In FIG. 8, a timing chart TC6 indicates a state of the detection value of the second detector 24. In the timing chart TC6, the level of the detection value of the second detector 24 is taken on an axis of ordinates, and the time is taken on an axis of abscissas.

In FIG. 8, a timing chart TC7 indicates a state of the supply speed of the feed roller pair 13. In the timing chart TC7, a speed is taken on an axis of ordinates, and a time is taken on an abscissas. In the timing chart TC7, a state of the transport speed of the transport roller pair 16 in accordance with the second mode is indicated by a dotted line.

In FIG. 8, a timing chart TC8 indicates a state of the difference in feed amount. In the timing chart TC8, the difference in feed amount is taken on an axis of ordinates, and the time is taken on an abscissas.

When the label printer 1 starts printing at a timing T21, the transport speed of the transport roller pair 16 is accelerated from zero toward the second transport speed V2. When the transport speed reaches the second transport speed V2, the transport roller pair 16 transports the transport roll paper RH at the second transport speed V2. The second transport speed V2 is slower than the first transport speed V1. Further, the second cutout 1521 is formed shorter than the first cutout 1511. Accordingly, in the transport in the second mode, a timing at which the feed roller pair 13 starts driving after the transport roller pair 16 starts driving is delayed compared to the first mode. Accordingly, the second acceleration and deceleration processing is performed a plurality of times until the feed roller pair 13 starts driving. After a timing T21, the feed control lever 15 rotates in the clockwise direction in a stepwise manner along with the driving of the transport roller pair 16.

At a timing T22, when the rotational angle of the feed control lever 15 from the fixed position is equal to or more than the angle θ5, the detection value of the second detector 24 changes from the Low level to the High level. Along with such a change, after the timing T22, the supply speed of the feed roller pair 13 is accelerated from zero toward the speed VK.

After the timing T22, the supply speed of the feed roller pair 13 is accelerated toward the speed VK. However, the transport speed of the transport roller pair 16 is the second transport speed V2 that is slower than the first transport speed V1 and hence, the detection value of the second detector 24 changes from the High level to the Low level at an earlier timing than the detection value of the first detector 23 in the first mode. The feed drive motor 14 of the present embodiment is configured to decelerate the supply speed of the feed roller pair 13 after accelerating the supply speed to the speed VK. Accordingly, even after a timing T23, the supply speed of the feed roller pair 13 increases toward the speed VK.

At a timing T24, when the supply speed of the feed roller pair 13 reaches the speed VK, the detection value of the second detector 24 is the low level and hence, the supply speed of the feed roller pair 13 is decelerated from the speed VK toward zero.

At a timing T25, the supply speed of the transport roller paper RH becomes zero. During a period between the timing T23 and the timing T25, the feed control lever 15 rotates in the counterclockwise direction. Accordingly, during such a period, after the difference in feed amount falls below 0, the inter-roller transport roll paper is slackened with the lapse of time. After the timing T25, the slackening of the inter-roller transport roll paper is not increased until a timing T26 at which the driving is restarted.

As illustrated in FIG. 8, also in the printing by the transport in accordance with the second mode, the difference in feed amount is changed between an upper limit and a lower limit. Accordingly, the label printer 1 can appropriately control the driving of the feed roller pair 13 in the printing by the transport in accordance with the second mode.

Assume that, in the printing by the transport in accordance with the second mode, the printing control unit 2202 controls the feed roller pair 13 based on the detection value of the first detector 23. In this case, the printing control unit 2202 starts driving of the feed roller pair 13 in a state where the rotational angle of the feed control lever 15 from the fixed position is small compared to a case where the feed roller pair 13 is controlled based on the detection value of the second detector 24. The feed roller pair 13 of the present embodiment is configured such that the feed roller pair 13 cannot be decelerated until the supply speed reaches the speed VK. Accordingly, irrelevant to the timing at which the feed roller pair 13 is driven, in other words, irrelevant to the rotational angle of the feed control lever 15 from the fixed position, in the printing by the transport in accordance with the second mode, slackening of the inter-roller transport roll paper occurs with the same amount of slackening of the inter-roller transport roll paper that occurs during a period between the timing T23 and the timing T25. Accordingly, when the driving of the feed roller pair 13 is started in a state where the rotational angle of the feed control lever 15 from the fixed position is smaller than the angle θ5, the difference in feed amount is converted into a negative value in a state where a negative amount of the length of the inter-roller transport roll paper is small. Accordingly, there is a possibility that slackening an amount of which is lower that the lower limit of the difference in feed amount occurs on the inter-roller transport roll paper. However, in the label printer 1 of the present embodiment, driving of the feed roller pair 13 is started in a state where the rotational angle of the feed control lever 15 from the fixed position is larger than the angle θ5 compared to the case where the driving of the feed roller pair 13 is started based on a detection value of the first detector 23. Accordingly, the difference in feed amount can be changed between the upper limit and the lower limit.

As has been described heretofore, the label printer 1 includes: the transport roller pair 16 configured to transport the roll paper R, the printing head 10 configured to perform printing on the roll paper R transported by the transport roller pair 16, the feed roller pair 13 configured to feed the roll paper R toward the transport roller pair 16, the printing control lever 15 positioned between the transport roller pair 16 and the feed roller pair 13 in the transport path of the roll paper R and configured to move following the change in the length of the roll paper R between the transport roller pair 16 and the feed roller pair 13, the first detector 23 configured to detect whether the rotational angle of the feed control lever 15 becomes the angle θ4, the second detector 24 configured to detect whether the rotational angle of the feed control lever 15 becomes the angle θ5 that is larger than the angle θ4, and the printing control unit 2202 configured to control the feed roller pair 13 based on the detection result of the first detector 23 and the detection result of the second detector 24. The transport roller pair 16 includes, as the drive mode thereof, the first mode in which the roll paper R is transported at the first transport speed V1, and the second mode in which the roll paper R is transported at the second transport speed V2 that is slower than the first transport speed V1. When the transport roller pair 16 is driven in the first mode, the printing control unit 2202 controls the driving of the transport roller pair 16 based on the detection result of the first detector 23, and when the transport roller pair 16 is driven in the second mode, the printing control unit 2202 controls the driving of the transport roller pair 16 based on the detection result of the second detector 24.

According to such a configuration, when the roll paper R is transported at the first transport speed V1, the label printer 1 can start the driving of the feed control lever 15 in a state where the rotational angle of the feed control lever 15 is small compared to the case where the roll paper R is transported at the second transport speed V2. Accordingly, it is possible to suppress the occurrence of a phenomenon that an excessively large tension is applied to the roll paper R. Further, when the roll paper R is transported at the second transport speed V2, the label printer 1 can start the driving of the feed control lever 15 in a state where the rotational angle of the feed control lever 15 is large compared to the case where the roll paper R is transported at the second transport speed V1. Accordingly, it is possible to suppress the occurrence of a phenomenon that the roll paper R is excessively slackened. Accordingly, the label printer 1 can appropriately control the driving of the feed roller pair 13 corresponding to the transport speed of the transport roller pair 16.

The feed control lever 15 includes the first feed control plate 151 and the second feed control plate 152. The first feed control plate 151 is provided corresponding to the first detector 23, and is configured such that the detection value of the first detector 23 is changed depending on whether the rotational angle of the feed control lever 15 is equal to or more than the angle θ4. The second feed control plate 152 is provided corresponding to the second detector 24, and is configured such that the detection value of the second detector 24 is changed depending on whether the rotational angle of the feed control lever 15 is equal to or more than the angle θ5.

With such a configuration, by providing the first feed control plate 151 to the first detector 23 and by providing the second feed control plate 152 to the second detector 24, it is possible to detect whether the rotational angle of the feed control lever 15 is equal to or more than θ4 and whether the rotational angle of the feed control lever 15 is equal to or more than the angle θ5. Accordingly, the label printer 1 can appropriately control the driving of the feed roller pair 13 corresponding to the transport speed of the transport roller pair 16 with the simple configuration.

The first detector 23 includes the first emission unit 231 and the first light-receiving unit 232 capable of receiving light that the first emission unit 231 emits. The first feed control plate 151 has the light shielding property, and is disposed between the first emission unit 231 and the first light-receiving unit 232 in an advancing direction of light that the first emission unit 231 emits. The first cutout 1511 is formed in the first feed control plate 151. The first cutout 1511 causes light that the first emission unit 231 emits to pass therethrough when the rotational angle of the feed control lever 15 is equal to or more than the angle θ4. The second detector 24 includes the first emission unit 241 and the second light-receiving unit 242 capable of receiving light that the second emission unit 241 emits. The second feed control plate 152 has the light shielding property, and is disposed between the second emission unit 241 and the second light-receiving unit 242 in an advancing direction of light that the second emission unit 241 emits. The second cutout 1521 is formed in the second feed control plate 152. The second cutout 1521 causes light that the second emission unit 241 emits to pass therethrough when the rotational angle of the feed control lever 15 is equal to or more than the angle θ5.

According to such a configuration, it is possible to appropriately control the driving of the feed roller pair 13 corresponding to the transport speed of the transport roller pair 16 by making use of transmission and shielding of light.

The feed control lever 15 includes the tension member 153 that applies a predetermined tension to the roll paper R. The tension member 153 rotates about the same rotary shaft KJ1 shared with the first feed control plate 151 and the second feed control plate 152 following a change in length of the roll paper R between the transport roller pair 16 and the feed roller pair 13.

According to such a configuration, it is possible to appropriately control the driving of the feed roller pair 13 corresponding to the transport speed of the transport roller pair 16 using the tension member 153 that applies a predetermined tension to the roll paper R.

Second Embodiment

Next, a second embodiment will be described.

With respect to configurations of respective units of a label printer 1 according to the second embodiment, the configurations identical with the corresponding configurations in the first embodiment are given the same symbols, and the detailed descriptions of the corresponding configurations are omitted.

The label printer 1 of the second embodiment differs from the label printer 1 of the first embodiment with respect to a configuration of a first feed control plate 151 and a configuration of a second feed control plate 152. The first feed control plate 151 and the second feed control plate 152 of the first embodiment are each made of a material having a light shielding property, and are each configured such that a cutout that causes light to pass therethrough is formed at the outer peripheral edge portion.

The first feed control plate 151 of the second embodiment is made of a material having light transmissivity, and is provided with a first light shielding portion for shielding light in place of the first cutout 1511. A length of the first light shielding portion in a circumferential direction and a length of the first light shielding portion in a radial direction are the same as those of the first cutout 1511. Further, a position at which the first light shielding portion of the first feed control plate 151 is disposed is the same position as the first cutout 1511.

The second feed control plate 152 of the second embodiment is made of a material having light transmissivity, and is provided with a second light shielding portion for shielding light in place of the second cutout 1521. A length of the second light shielding portion in a circumferential direction and a length of the second light shielding portion in a radial direction are the same as those of the second cutout 1521. Further, a position at which the second light shielding portion of the second feed control plate 152 is disposed is the same position as the second cutout 1521.

A first emission unit 231 of the second embodiment is configured such that, when a portion to which light is emitted by the first emission unit 231 is a portion other than the first light shielding portion, a first light-receiving unit 232 receives light that the first emission unit 231 emits. Accordingly, the first detector 23 of the second embodiment outputs a High-level detection value. On the other hand, when a portion to which light is emitted by the first emission unit 231 is the first light shielding portion, the first light-receiving unit 232 does not receive light that the first emission unit 231 emits. Accordingly, the first detector 23 of the second embodiment outputs a Low-level detection value.

A second detector 24 of the second embodiment is configured such that, when a portion to which light is emitted by a second emission unit 241 is a portion other than the second light shielding portion, a second light-receiving unit 242 receives light that the second emission unit 241 emits. Accordingly, the second detector 24 of the second embodiment outputs a High-level detection value. On the other hand, the second detector 24 of the second embodiment is configured such that, when a portion to which light is emitted by the second emission unit 241 is the second light shielding portion, the second light-receiving unit 242 does not receive light that the second emission unit 241 emits. Accordingly, the second detector 24 of the second embodiment outputs a Low-level detection value.

A printing control unit 2202 of the second embodiment is configured such that, when the first detector 23 and the second detector 24 output High-level detection values, the printing control unit 2202 stops driving of a feed drive motor 14 to prevent driving of a feed roller pair 13. When the first detector 23 and the second detector 24 output Low level detection values, the printing control unit 2202 drives the feed drive motor 14 to drive the feed roller pair 13.

As has been described heretofore, the first detector 23 includes the first emission unit 231, and the first light-receiving unit 232 capable of receiving light that the first emission unit 231 emits. The first feed control plate 151 has light transmissivity, and is disposed between the first emission unit 231 and the first light-receiving unit 232 in an advancing direction of light that the first emission unit 231 emits. In the first feed control plate 151, a first light shielding portion is formed. The first light shielding portion is positioned between the first emission unit 231 and the first light-receiving unit 232 when a rotational angle of a feed control lever 15 is equal to or more than an angle θ4. The second detector 24 includes the second emission unit 241, and the second light-receiving unit 242 capable of receiving light that the second emission unit 241 emits. The second feed control plate 152 has light transmissivity, and is disposed between the second emission unit 241 and the second light-receiving unit 242 in an advancing direction of light that the second emission unit 241 emits. In the second feed control plate 152, a second light shielding portion is formed. The second light shielding portion is positioned between the second emission unit 241 and the second light-receiving unit 242 when the rotational angle of the feed control lever 15 is equal to or more than an angle θ5.

According to the label printer 1 of the second embodiment, it is possible to obtain substantially the same advantageous effects as the label printer 1 of the first embodiment.

Third Embodiment

Next, a third embodiment will be described.

With respect to configurations of respective units of a label printer 1 according to the third embodiment, the configurations identical with the corresponding configurations in the first embodiment are given the same symbols, and the detailed descriptions of the configurations are omitted.

The label printer 1 of the third embodiment differs from the label printer 1 of the first embodiment with respect to a configuration of a feed control lever 15, and positions where a first detector 23 and a second detector 24 are disposed.

Figure 9:
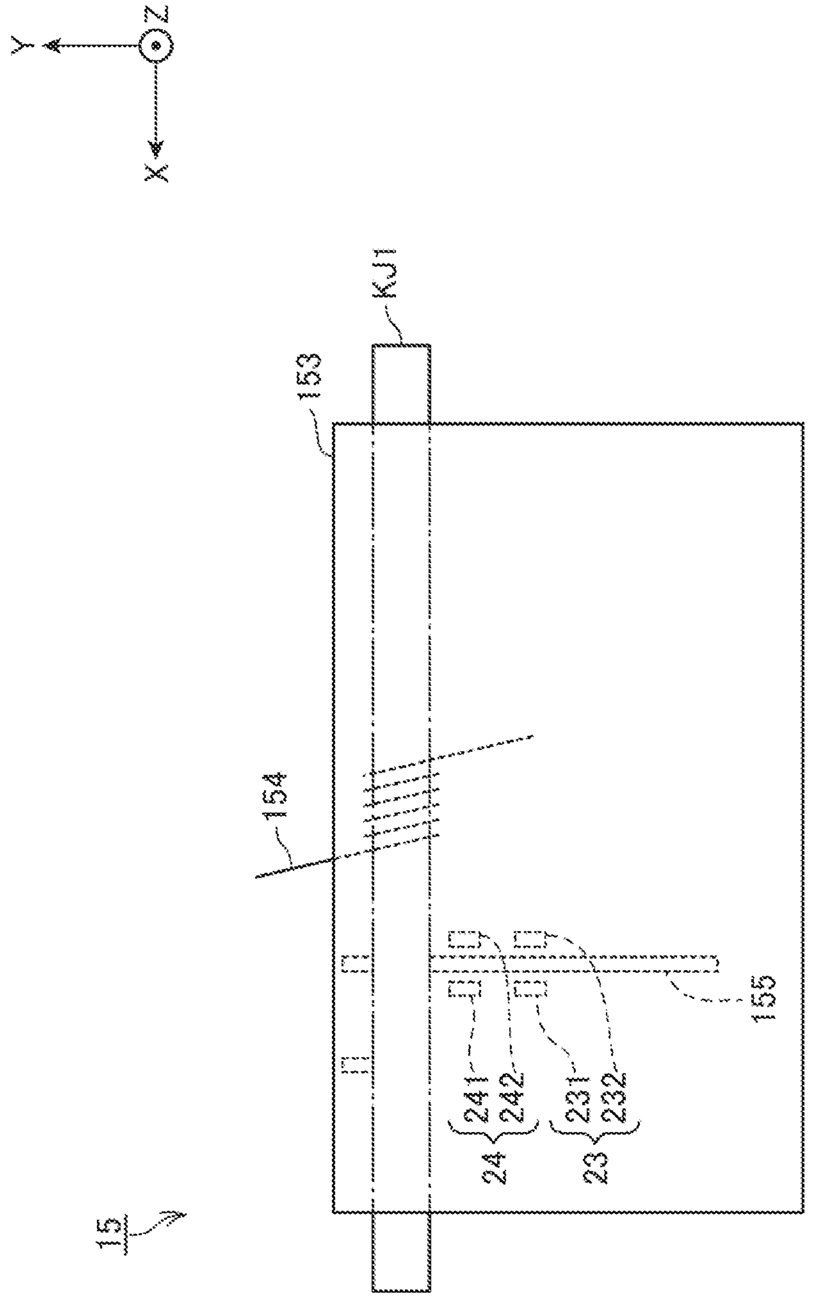
FIG. 9 is a view of the feed control lever as viewed from above.
Figure 10:
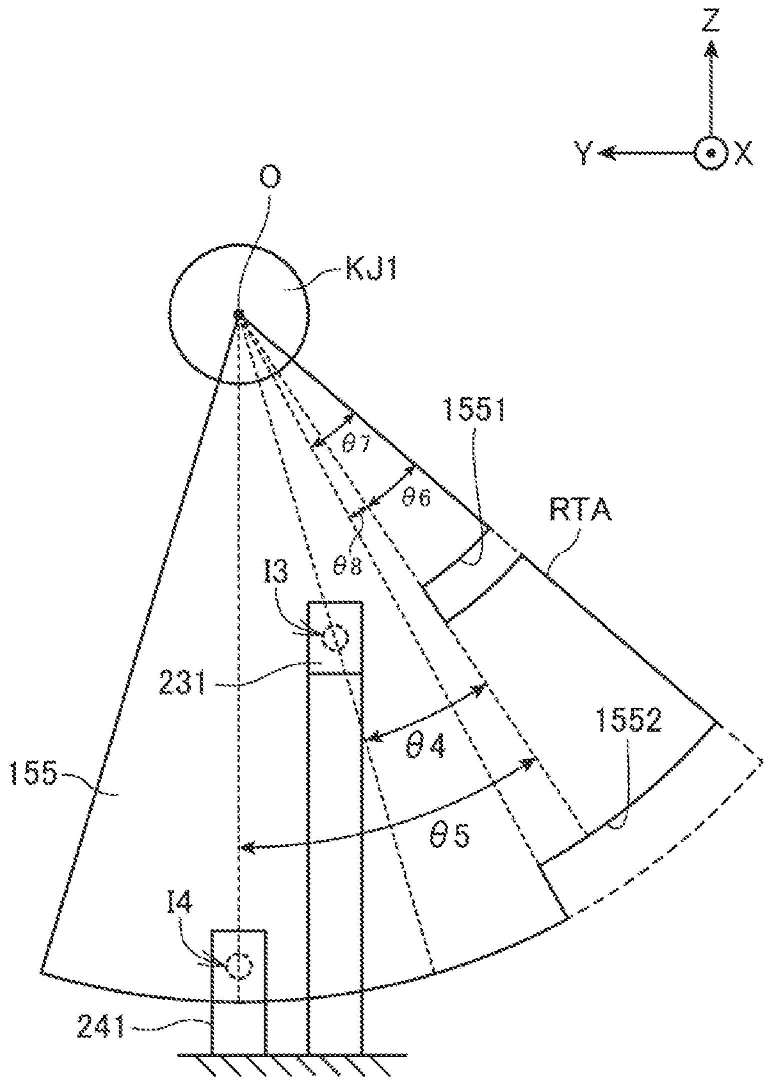
FIG. 10 is a view illustrating a configuration of the feed control lever.

FIG. 9 is a view of the feed control lever 15 of the third embodiment as viewed from above. FIG. 10 is a view illustrating a configuration of the feed control lever 15 of the third embodiment.

The feed control lever 15 of the third embodiment includes a third feed control plate 155 in place of the first feed control plate 151 and the second feed control plate 152. The third feed control plate 155 corresponds to an example of a third movable member.

The third feed control plate 155 is a member having a fan shape with a rotary shaft KJ1 as the center of rotation. The third feed control plate 155 of the present embodiment is made of a material having a light shielding property. In the third feed control plate 155, a third cutout 1551 is formed at a position closer to the rotary shaft KJ1 than a fourth cutout 1552 in a radial direction. The third cutout 1551 is formed extending in a circumferential direction from a rear end edge RTA that corresponds to a radius of the fan shape. A length of the third cutout 1551 in the circumferential direction is a length corresponding to an angle θ6. The angle θ6 is an angle from the rear end edge RTA with the center of rotation O of the rotary shaft KJ1 as an apex.

The third cutout 1551 corresponds to an example of a third light transmitting portion. The fourth cutout 1552 corresponds to an example of a fourth light transmitting portion.

The fourth cutout 1552 is formed at an outer peripheral edge portion of the third feed control plate 155. The fourth cutout 1552 is formed extending in a circumferential direction from the rear end edge RTA that corresponds to a radius of the fan shape. A length of the fourth cutout 1552 in the circumferential direction is a length corresponding to an angle θ7. The angle θ7 is an angle from the rear end edge RTA with the center of rotation O of the rotary shaft KJ1 as an apex. The angle θ7 is larger than the angle θ6 by an amount of an angle θ8.

The third feed control plate 155 is provided such that the center of the fan shape agrees with the center of rotation O of the rotary shaft KJ1 in the vertical direction. The third feed control plate 155 rotates about the rotary shaft KJ1 in synchronization with the rotation of a tension member 153.

The first detector 23 is disposed above and behind the second detector 24. A first emission unit 231 emits light toward the third feed control plate 155. A first light-receiving unit 232 is disposed at a position on a side opposite to the first emission unit 231 in a left-and-right direction in a state where a light-receiving surface of the first light-receiving unit 232 faces the third feed control plate 155.

When the feed control lever 15 is located at a fixed position, the first emission unit 231 emits light to a third position 13. When the feed control lever 15 rotates by an angle θ4 or more in the clockwise direction from the fixed position, the first emission unit 231 emits light to the third cutout 1551.

The second detector 24 is disposed below and in front of the first detector 23. A second emission unit 241 emits light toward the third feed control plate 155. A second light-receiving unit 242 is disposed at a position on a side opposite to the second emission unit 241 in a left-and-right direction in a state where a light-receiving surface of the second light-receiving unit 242 faces the third feed control plate 155.

When the feed control lever 15 is located at the fixed position, the second emission unit 241 emits light to a fourth position 14. When the feed control lever 15 rotates by an angle θ5 or more in the clockwise direction from the fixed position, the second emission unit 241 emits light to the fourth cutout 1552.

When a transport roll paper RH is driven in a first mode, a printing control unit 2202 of the third embodiment controls driving of a feed roller pair 13 based on a detection value of the first detector 23. When the transport roll paper RH is driven in a second mode, the printing control unit 2202 controls the driving of the feed roller pair 13 based on a detection value of the second detector 24.

As has been described heretofore, the feed control lever 15 includes the third feed control plate 155. The third feed control plate 155 has the light shielding property, and is disposed at a position between the first emission unit 231 and the first light-receiving unit 232 in the advancing direction of light that the first emission unit 231 emits and between the second emission unit 241 and the second light-receiving unit 242 in the advancing direction of light that the second emission unit 241 emits. In the first feed control plate 151, the third cutout 1551 and the second cutout 1552 are formed. The third cutout 1551 is positioned between the first emission unit 231 and the first light-receiving unit 232 when the rotational angle of the feed control lever 15 is equal to or more than the angle θ4. The second cutout 1552 is positioned between the second emission unit 241 and the second light-receiving unit 242 when the rotational angle of the feed control lever 15 is equal to or more than the angle θ5.

According to the label printer 1 of the third embodiment, it is possible to obtain substantially the same advantageous effects as the label printer 1 of the first embodiment.

Fourth Embodiment

Next, a fourth embodiment will be described.

Figure 11:
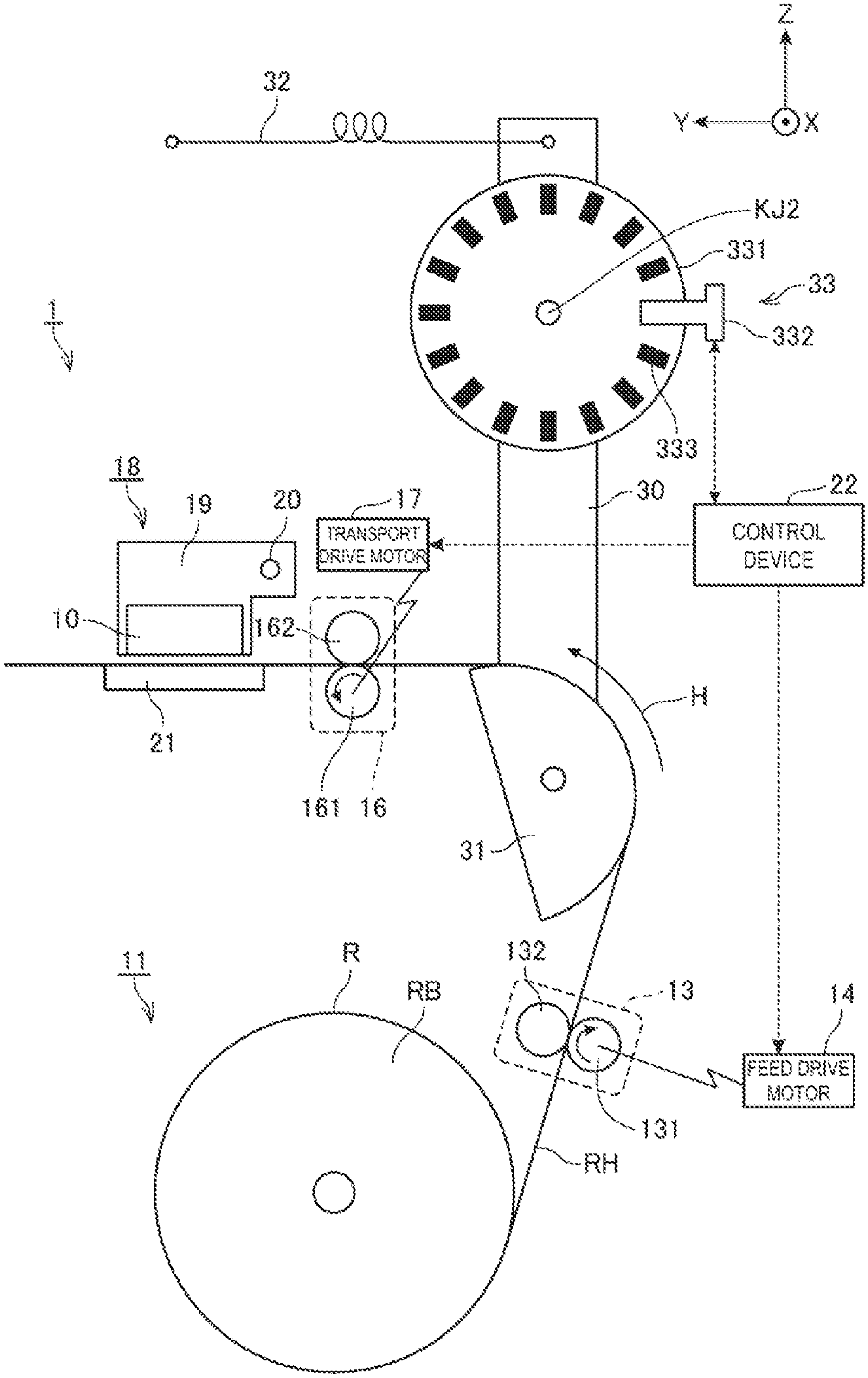
FIG. 11 is a view illustrating a configuration of the label printer.

FIG. 11 is a view illustrating a configuration of a label printer 1 according to the fourth embodiment.

With respect to configurations of respective units of the label printer 1 according to the fourth embodiment, the configurations identical with the corresponding configurations in the first embodiment are given the same symbols, and the detailed descriptions of the configurations are omitted.

The label printer 1 according to the fourth embodiment includes a slackening lever 30 between a feed roller pair 13 and a transport roller pair 16 on a transport path of a transport roll paper RH. The slackening lever 30 is rotatable about a rotary shaft KJ2 following a change in length of a roll paper R between the transport roller pair 16 and the feed roller pair 13.

The slackening lever 30 corresponds to an example of the movable member.

A bridging member 31 is attached to a lower end portion of the slackening lever 30. The transport roll paper RH extends over a circular arc-shaped surface of the bridging member 31. One end of a coil spring 32 is coupled to an upper end portion of the slackening lever 30. The slackening lever 30 applies a predetermined tension to the transport roll paper RH by the coil spring 32.

The label printer 1 according to the fourth embodiment includes a rotary encoder 33. The rotary encoder 33 includes an encoding disc 331 that rotates integrally with the slackening lever 30 about a rotary shaft KJ2, and a third detector 332 that is an optical sensor. The encoder disc 331 is made of a material having light-shielding property, and a plurality of rotation detection slits 333 for rotation detection are formed in the encoder disc 331 at a constant pitch in a circumferential direction. Further, the encoder disc 331 includes a predetermined-position-use slit that defines the fixed position of the slackening lever 30. The third detector 332 includes an emission unit configured to emit light to the encoder disc 331, and a light-receiving unit configured to receive light that the emission unit emits. The encoder disc 331 is disposed between the emission unit and the light-receiving unit of the third detector 332 in a left-and-right direction. The third detector 332 detects a rotational angle of the slackening lever 30 from the fixed position by counting the number of rotation detection slits 333. The third detector 332 outputs a detection result to the control device 22.

The rotary encoder 33 corresponds to an example of a detection unit and an encoder. The encoder disc 331 corresponds to an example of the light-shielding member. The rotation detection slit 333 corresponds to an example of a light-transmitting portion. A rotational angle of the slackening lever 30 corresponds to an example of a moving amount of the movable member.

A printing control unit 2202 of the fourth embodiment is configured such that, in a case where the transport roller pair 16 is driven in the first mode, when it is determined that the rotational angle of the slackening lever 30 from the fixed position is less than a first angle based on a detection value of the rotary encoder 33, the printing control unit 2202 stops driving of a feed drive motor 14 to prevent driving of the feed roller pair 13. On the other hand, in the case where the transport roller pair 16 is driven in the first mode, when it is determined that the rotational angle of the slackening lever 30 from the fixed position is equal to or more than the first angle based on a detection value of the rotary encoder 33, the printing control unit 2202 drives the feed drive motor 14 to drive the feed roller pair 13. The first angle is the angle θ4 in the above-mentioned embodiment, for example.

The first angle corresponds to an example of a first moving amount.

The printing control unit 2202 of the fourth embodiment is configured such that, in a case where the transport roller pair 16 is driven in the second mode, when it is determined that the rotational angle of the slackening lever 30 from the fixed position is less than a second angle that is larger than the first angle based on a detection value of the rotary encoder, the printing control unit 2202 stops the driving of the feed drive motor 14 to stop the driving of the feed roller pair 13. On the other hand, in a case where the transport roller pair 16 is driven in the second mode, when it is determined that the rotational angle of the slackening lever 30 from the fixed position is equal to or more than the second angle based on a detection value of the rotary encoder 33, the printing control unit 2202 drives the feed drive motor 14 to drive the feed roller pair 13. The second angle is the angle θ5 in the above-mentioned embodiment, for example.

The second angle corresponds to an example of a second moving amount.

Further, in a case where the transport roller pair 16 is driven in the first mode, when it is determined that the rotational angle of the slackening lever 30 from the fixed position is equal to or more than a third angle based on a detection value of the rotary encoder 33, the printing control unit 2202 of the fourth embodiment stops driving of the feed drive motor 14 to prevent driving of the feed roller pair 13. The third angle is an angle obtained by adding an angle that a first feed control plate 151 moves during a period between the timing T12 and the timing T14 in the above-mentioned embodiment to the first angle.

Further, in a case where the transport roller pair 16 is driven in the second mode, when it is determined that the rotational angle of the slackening lever 30 from the fixed position is equal to or more than a fourth angle based on a detection value of the rotary encoder 33, the printing control unit 2202 of the fourth embodiment stops the driving of the feed drive motor 14 to prevent driving of the feed roller pair 13. The fourth angle is an angle obtained by adding an angle that the second feed control plate 152 moves during a period between the timing T22 and the timing T23 in the above-mentioned embodiment to the second angle.

As has been described heretofore, the label printer 1 includes: the transport roller pair 16 configured to transport the roll paper R, the printing head 10 configured to perform printing on the roll paper R transported by the transport roller pair 16, the feed roller pair 13 configured to feed the roll paper R toward the transport roller pair 16, the slackening lever 30 positioned between the transport roller pair 16 and the feed roller pair 13 in the transport path of the roll paper R and configured to move following the change in the length of the roll paper R between the transport roller pair 16 and the feed roller pair 13, the rotary encoder 33 configured to detect the rotational angle of the slackening lever 30, and the printing control unit 2202 configured to control driving of the feed roller pair 13 based on the detection result of the rotary encoder 33. The transport roller pair 16 has the first mode and the second mode as the drive mode. In a case where the transport roller pair 16 is driven in the first mode, when the rotational angle of the slackening lever 30 reaches the first angle or more, the printing control unit 2202 controls driving of the feed roller pair 13. In a case where the transport roller pair 16 is driven in the second mode, when the rotational angle of the slackening lever 30 reaches the second angle or more that is larger than the first angle, the printing control unit 2202 controls driving of the feed roller pair 13.

With such a configuration, the label printer 1 of the fourth embodiment can obtain substantially the same advantageous effects as the label printer 1 of the first embodiment.

Further, the rotary encoder 33 includes the emission unit, the light-receiving unit capable of receiving light that the emission unit emits, and the encoder disc 331 provided with the rotary detection slits 333 at a predetermined interval. The encoder disc 331 is disposed between the emission unit and the light-receiving unit in the advancing direction of light that the emission unit emits, and moves along with the movement of the slackening lever 30. The rotary encoder 33 is configured to detect the rotational angle of the slackening lever 30 by counting the number of the rotation detection slits 333.

According to such a configuration, it is possible to appropriately control driving of the feed roller pair 13 corresponding to the transport speed of the transport roller pair 16 by using the optical rotary encoder 33.

Fifth Embodiment

Next, a fifth embodiment will be described.

With respect to configurations of respective units of a label printer 1 according to the fifth embodiment, the configurations identical with the corresponding configurations in above-mentioned respective embodiments are given the same symbols, and the detailed descriptions of the configurations are omitted.

The label printer 1 of the fifth embodiment differs from the above-mentioned label printers 1 with respect to a supply speed of a feed roller pair 13. In the above-mentioned label printers 1, the supply speed of the feed roller pair 13 is only one kind speed, that is, the speed VK. The label printer 1 of the fifth embodiment is configured such the feed roller pair 13 feeds a transport roll paper RH at a first supply speed or a second supply speed that is slower than the first supply speed.

When a transport roller pair 16 is driven in a first mode, a printing control unit 2202 drives the feed roller pair 13 such that the supply speed becomes the first supply speed. When the transport roller pair 16 is driven in a second mode, the printing control unit 2202 drives the feed roller pair 13 such that the supply speed becomes the second supply speed.

As has been described heretofore, the label printer 1 includes: the transport roller pair 16 configured to transport the roll paper R, the printing head 10 configured to perform printing on the roll paper R transported by the transport roller pair 16, the feed roller pair 13 configured to feed the roll paper R toward the transport roller pair 16, and the printing control unit 2202 configured to control driving of the feed roller pair 13. The transport roller pair 16 has the first mode and the second mode as the drive mode. When the transport roller pair 16 is driven in the first mode, the printing control unit 2202 performs control of setting the supply speed of the feed roller pair 13 to the first supply speed, and when the transport roller pair 16 is driven in the second mode, the printing control unit 2202 performs control of setting the supply speed of the feed roller pair 13 to the second supply speed that is slower than the first supply speed.

According to such a configuration, in the label printer 1 of the fifth embodiment, when the roll paper R is transported at a first transport speed V1, the supply speed of the feed roller pair 13 is increased compared to a case where the roll paper R is transported at a second transport speed V2 and hence, it is possible to suppress the occurrence of a phenomenon that an excessively large tension is applied to the roll paper R. Further, in the label printer 1 of the fifth embodiment, when the roll paper R is transported at the second transport speed V2, the supply speed of the feed roller pair 13 is decreased compared to a case where the roll paper R is transported at the first transport speed V1 and hence, it is possible to suppress the occurrence of a phenomenon that the roll paper R is excessively largely slackened. Accordingly, the label printer 1 of the fifth embodiment can acquire substantially the same advantageous effects as the label printer 1 of the first embodiment.

Each of the above-mentioned embodiments is merely a specific example to which the present disclosure is applied. The present disclosure is not limited to the configurations in the above-mentioned embodiments, and can be implemented in various modes without departing from the gist of the disclosure.

For example, each of the above-mentioned embodiments exemplifies the label printer 1 as the printing apparatus. However, the printing apparatus is not limited to the label printer 1. The printing apparatus may be a device including a transporting mechanism configured to accommodate the roll paper R and transport the roll paper R to the upstream of the printing head 10 in the transport direction H of the roll paper R, and a feed mechanism configured to feed the roll paper R to the transport mechanism. For example, the printing apparatus may also be a large format printer, a printing machine that performs printing, or the like.

In each of the above-mentioned embodiments, the serial head type printing head is exemplified as the printing head 10. However, in a printing apparatus configured to transport a roll paper R using an intermittent transport system, a line head type printing head may also be adopted. The printing method of the printing head 10 is not limited to the ink-jet type.

Further, in each of the above-mentioned embodiments, the transport roller pair 16 is exemplified as the medium transport mechanism. However, the medium transport mechanism may further include one or a plurality of rollers disposed downstream of the feed control lever 15. The rollers further included in the medium transport mechanism may also be rotating rollers, driven rollers, or both of the rotating roller and the driven roller.

Further, in each of the above-mentioned embodiments, the feed roller pair 13 is exemplified as the medium supply mechanism. However, the medium supply mechanism may further include one or a plurality of rollers disposed upstream of the feed control lever 15. The rollers additionally included in the medium supply mechanism may be rotating rollers, driven rollers, or both of the rotary roller and the driven roller.

Additionally, in each of the above-mentioned embodiments, the label printer 1 in which the transport roller pair 16 transports the roll paper R at the transport speed of the first transport speed V1 or the second transport speed V2 is exemplified. However, the transport speed of the transport roller pair 16 is not limited to two kinds of the first transport speed V1 and the second transport speed V2, and three or more kinds of transport speeds may also be adopted. In a case where three kinds or more transport speeds are adopted as the transport speed of the transport roller pair 16, the label printer 1 controls driving of the feed roller pair 13 based on a detection result of the first detector 23 at least when the roll paper R is transported at a fastest speed. The label printer 1 controls driving of the feed roller pair 13 based on a detection result of the second detector 24 at least when the roll paper R is transported at the slowest speed.

Further, in the above-mentioned fourth embodiment, the optical rotary encoder is exemplified as the detection unit. However, the detection unit is not limited to the optical rotary encoder, and may be a magnetic rotary encoder, a laser-type rotary encoder, or an electrostatic capacitive rotary encoder. The detection unit may also be a linear encoder. Further, the encoder as the detection unit is not limited to an incremental type encoder, but may be an absolute type encoder.

Further, in the first embodiment and the third embodiment described above, the cutout is exemplified as the first light transmitting portion, the second light transmitting portion, the third light transmitting portion, and the fourth light transmitting portion. However, the first light transmitting portion, the second light transmitting portion, the third light transmitting portion, and the fourth light transmitting portion are not limited to the cutout, and may be formed of a hole or a light transmissive member.

The device control unit 2201 and the printing control unit 2202 may be implemented by a plurality of processors or a plurality of semiconductor chips.

In addition, the respective units illustrated in FIG. 5 are examples, and specific implementations are not particularly limited. In other words, hardware that individually correspond to respective functional units are not necessarily implemented and, as a matter of course, a single processor executes programs to enable functions of the respective functional units. Further, in the above-described embodiments, some of the functions realized by software may be realized by hardware, or some of the functions realized by hardware may be realized by software. In addition, the specific detailed configurations of other units of the label printer 1 may be arbitrarily modified.

For example, step units of the manner of operation illustrated in FIG. 6 are obtained by dividing processing in accordance with main processing contents to facilitate the understanding of the processing of the respective units of the label printer 1. Accordingly, there is no possibility that the present disclosure is limited by a method for dividing processing into processing units and a name of the method. Depending on the processing contents, the processing may be divided into even more step units. Further, one step unit may be divided so as to include more processes. Further, the order of the steps may be changed as appropriate within the scope of the present invention.

The present disclosure is not limited to the present embodiments described above, and can be realized in various configurations without departing from the gist of the present disclosure. Appropriate replacements or combinations may be made to the technical features in the present embodiments that correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A printing apparatus comprising:
a medium transport mechanism configured to transport a printing medium;
a printing head configured to perform printing on the printing medium transported by the medium transport mechanism;
a medium supply mechanism configured to supply the printing medium toward the medium transport mechanism;
a movable member positioned between the medium transport mechanism and the medium supply mechanism on a transport path of the printing medium, the movable member being configured to move following a change in length of the printing medium between the medium transport mechanism and the medium supply mechanism;
a first detector configured to detect whether a moving amount of the movable member becomes equal to or more than a first threshold;
a second detector configured to detect whether the moving amount of the movable member becomes equal to or more than a second threshold that is larger than the first threshold; and
a control unit configured to control driving of the medium supply mechanism based on a detection result of the first detector or a detection result of the second detector, wherein
the medium transport mechanism has, as a drive mode, a first mode in which the printing medium is transported at a first transport speed, and a second mode in which the printing medium is transported at a second transport speed that is slower than the first transport speed, and
the control unit is configured to control the driving of the medium supply mechanism based on the detection result of the first detector when the medium transport mechanism is driven in the first mode, and is configured to control the driving of the medium supply mechanism based on the detection result of the second detector when the medium transport mechanism is driven in the second mode.

2. The printing apparatus according to claim 1, wherein the movable member includes:
a first movable member disposed corresponding to the first detector, the first movable member being configured such that a detection value that the first detector outputs differs corresponding to whether the moving amount of the movable member becomes equal to or more than the first threshold; and
a second movable member disposed corresponding to the second detector, the second movable member being configured such that a detection value that the second detector outputs differs corresponding to whether the moving amount of the movable member becomes equal to or more than the second threshold.

3. The printing apparatus according to claim 2, wherein
the first detector includes a first emission unit, and a first light-receiving unit configured to receive light that the first emission unit emits,
the first movable member has a light shielding property and is disposed between the first emission unit and the first light-receiving unit in an advancing direction of light that the first emission unit emits,
a first light transmitting portion is formed at the first movable member, the first light transmitting portion transmitting light that the first emission unit emits when the moving amount of the movable member is equal to or more than the first threshold, and
the second detector includes a second emission unit, and a second light-receiving unit configured to receive light the second emission unit emits,
the second movable member has a light shielding property and is disposed between the second emission unit and the second light-receiving unit in an advancing direction of light that the second emission unit emits,
a second light transmitting portion is formed at the second movable member, the second light transmitting portion transmitting light that the second emission unit emits when the moving amount of the movable member is equal to or more than the second threshold.

4. The printing apparatus according to claim 2, wherein
the first detector includes a first emission unit, and a first light-receiving unit configured to receive light that the first emission unit emits,
the first movable member has light transmissivity and is disposed between the first emission unit and the first light-receiving unit in an advancing direction of light the first emission unit emits,
a first light shielding portion is formed at the first movable member, the first light shielding portion being positioned between the first emission unit and the first light-receiving unit when the moving amount of the first movable member is equal to or more than the first threshold,
the second detector includes a second emission unit, and a second light-receiving unit configured to receive light that the second emission unit emits,
the second movable member has light transmissivity and is disposed between the second emission unit and the second light-receiving unit in an advancing direction of light that the second emission unit emits, and
a second light shielding portion is formed at the second movable member, the second light shielding portion being positioned between the second emission unit and the second light-receiving unit when the moving amount of the second movable member is equal to or more than the second threshold.

5. The printing apparatus according to claim 2, wherein
the movable member includes a tension member that applies a predetermined tension to the printing medium, and
the tension member is configured to rotate, about a rotary shaft shared with the first movable member and the second movable member, following a change in length of the printing medium between the medium transport mechanism and the medium supply mechanism.

6. The printing apparatus according to claim 1, wherein
the first detector includes a first emission unit, and a first light-receiving unit configured to receive light that the first emission unit emits,
the second detector includes a second emission unit, and a second light-receiving unit configured to receive light that the second emission unit emits,
the movable member includes a third movable member having a light shielding property,
the third movable member is disposed at a position between the first emission unit and the first light-receiving unit in an advancing direction of the light that the first emission unit emits and between the second emission unit and the second light-receiving unit in an advancing direction of the light that the second emission unit emits, and the third movable member is formed with a third light transmitting portion transmitting the light that the first emission unit emits when a moving amount of the third movable member is equal to or more than the first threshold, and a fourth light transmitting portion transmitting the light that the second emission unit emits when the moving amount of the third movable member is equal to or more than the second threshold.

* * * * *